Figure 1:
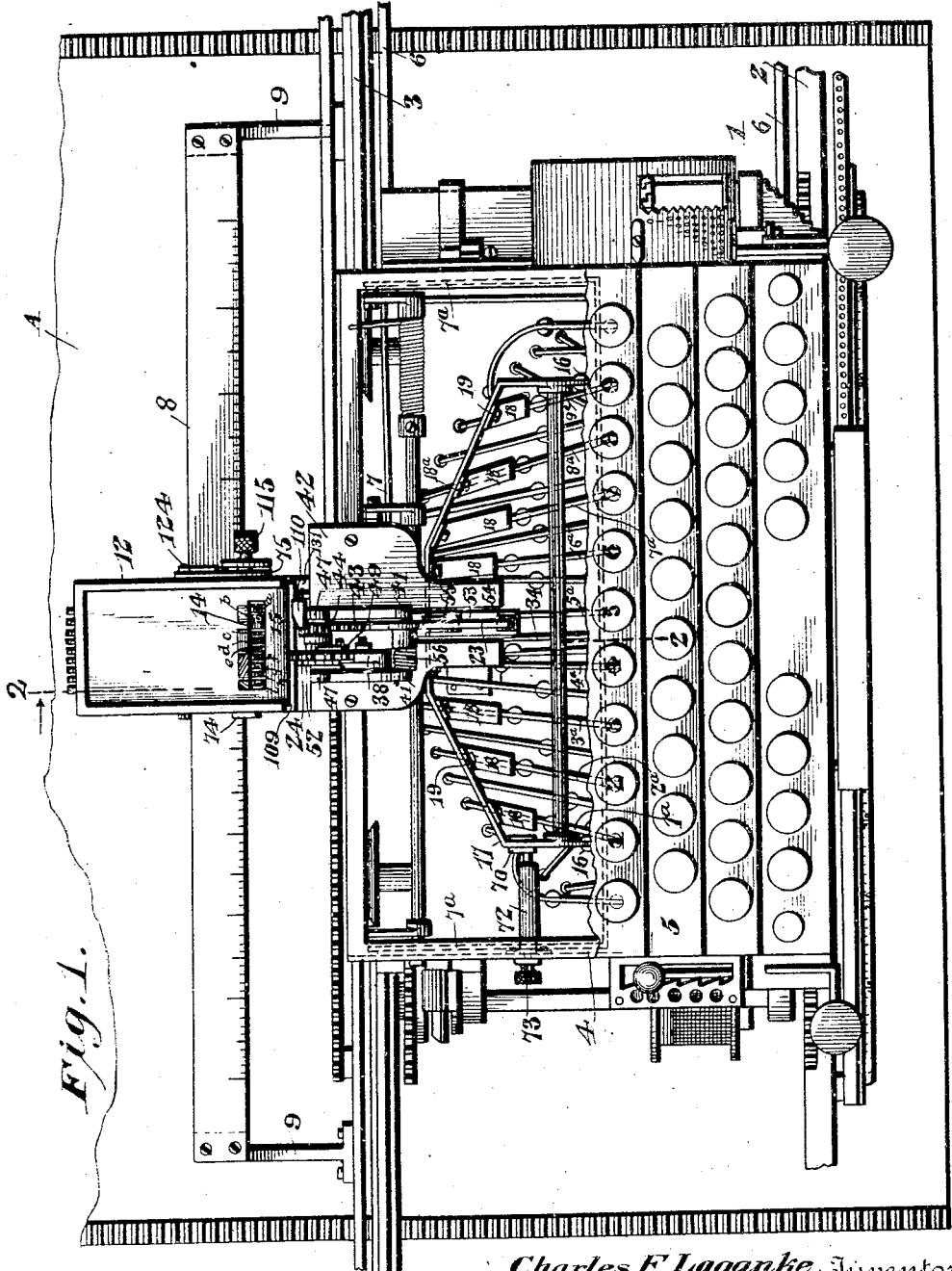

C. F. LAGANKE & J. A. SMITH.
CALCULATING AND TYPE WRITING MACHINE.
APPLICATION FILED AUG. 25, 1902.

1,070,142.

Patented Aug. 12, 1913.
9 SHEETS—SHEET 1.

Charles F. Laganke, Inventors
John A. Smith

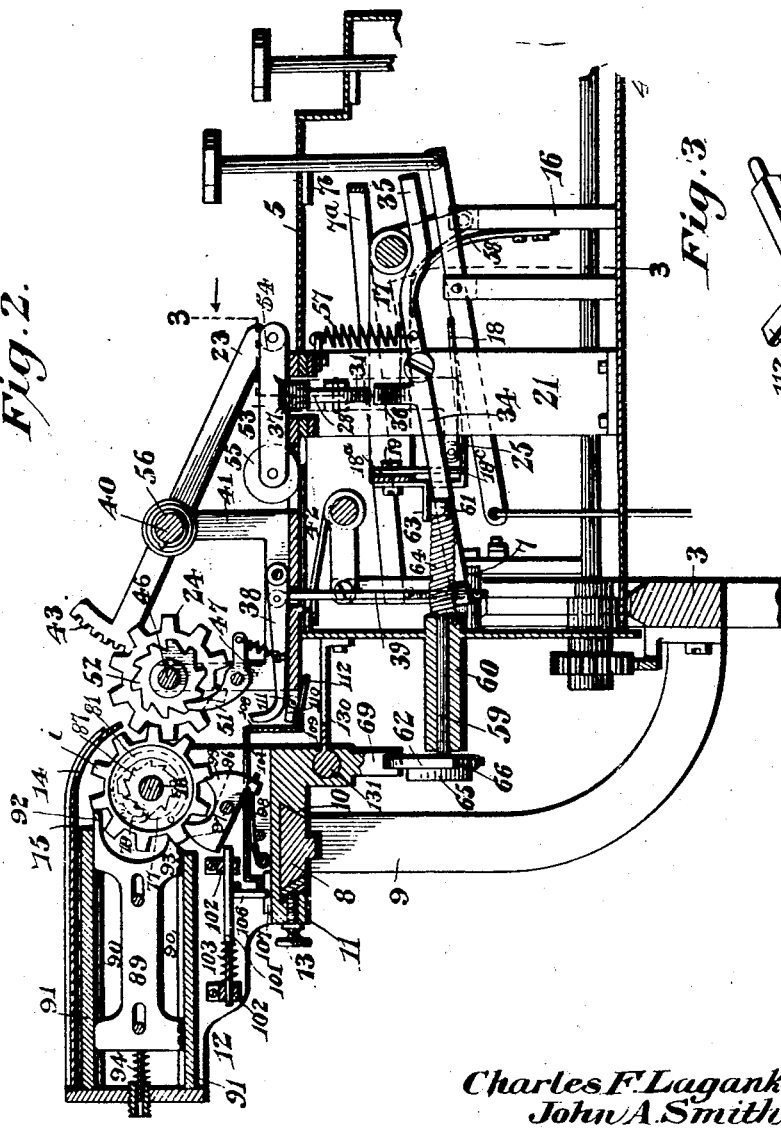

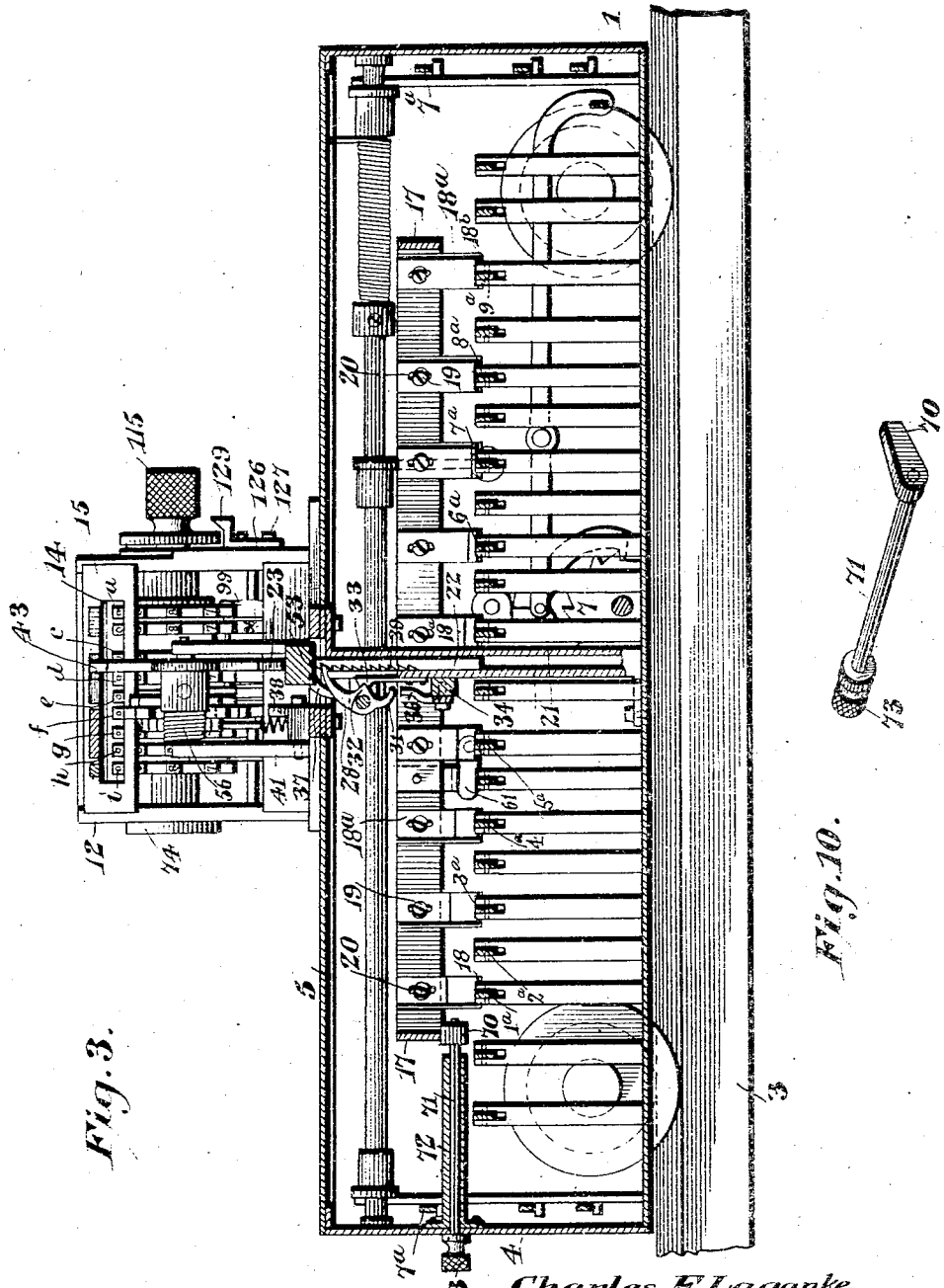

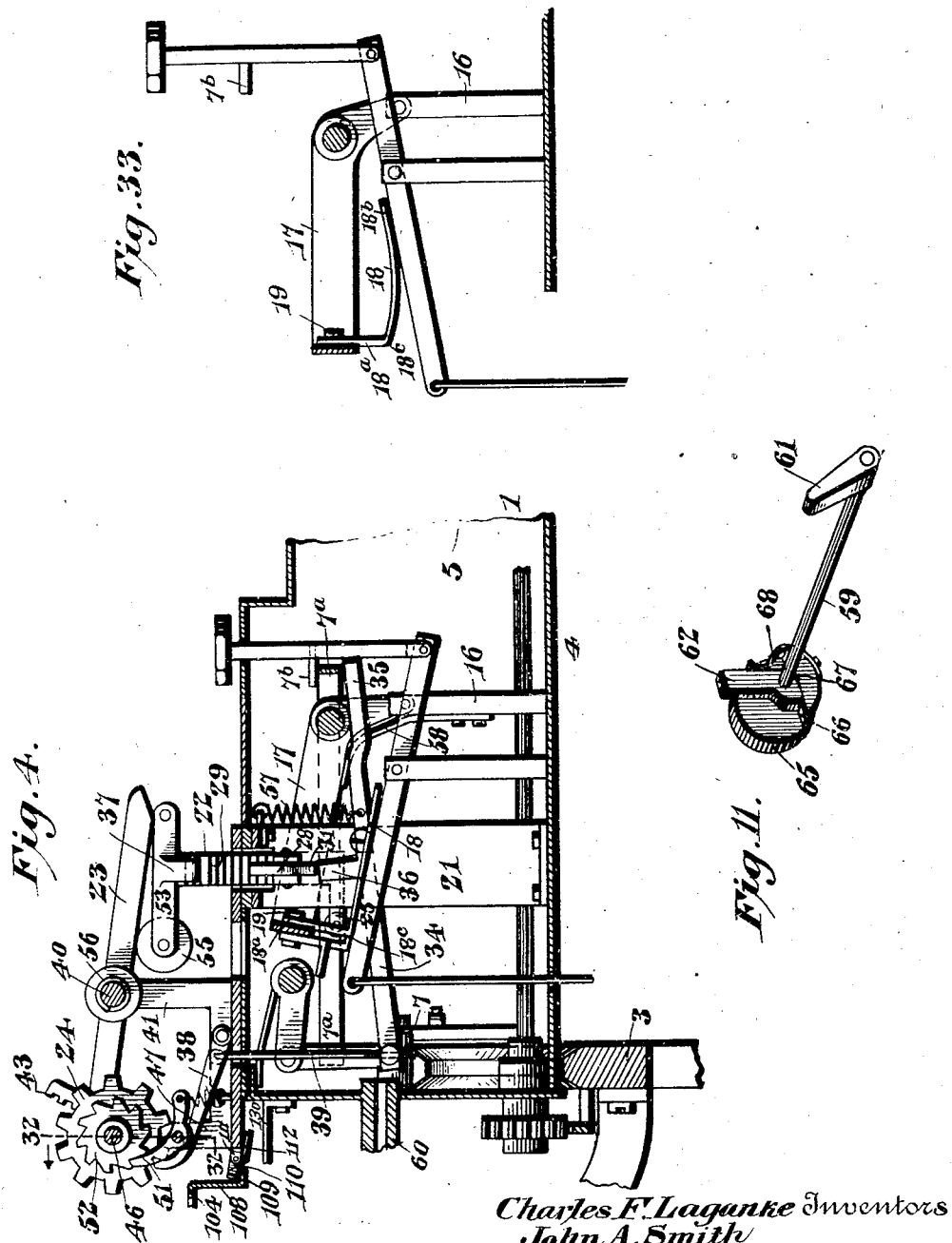

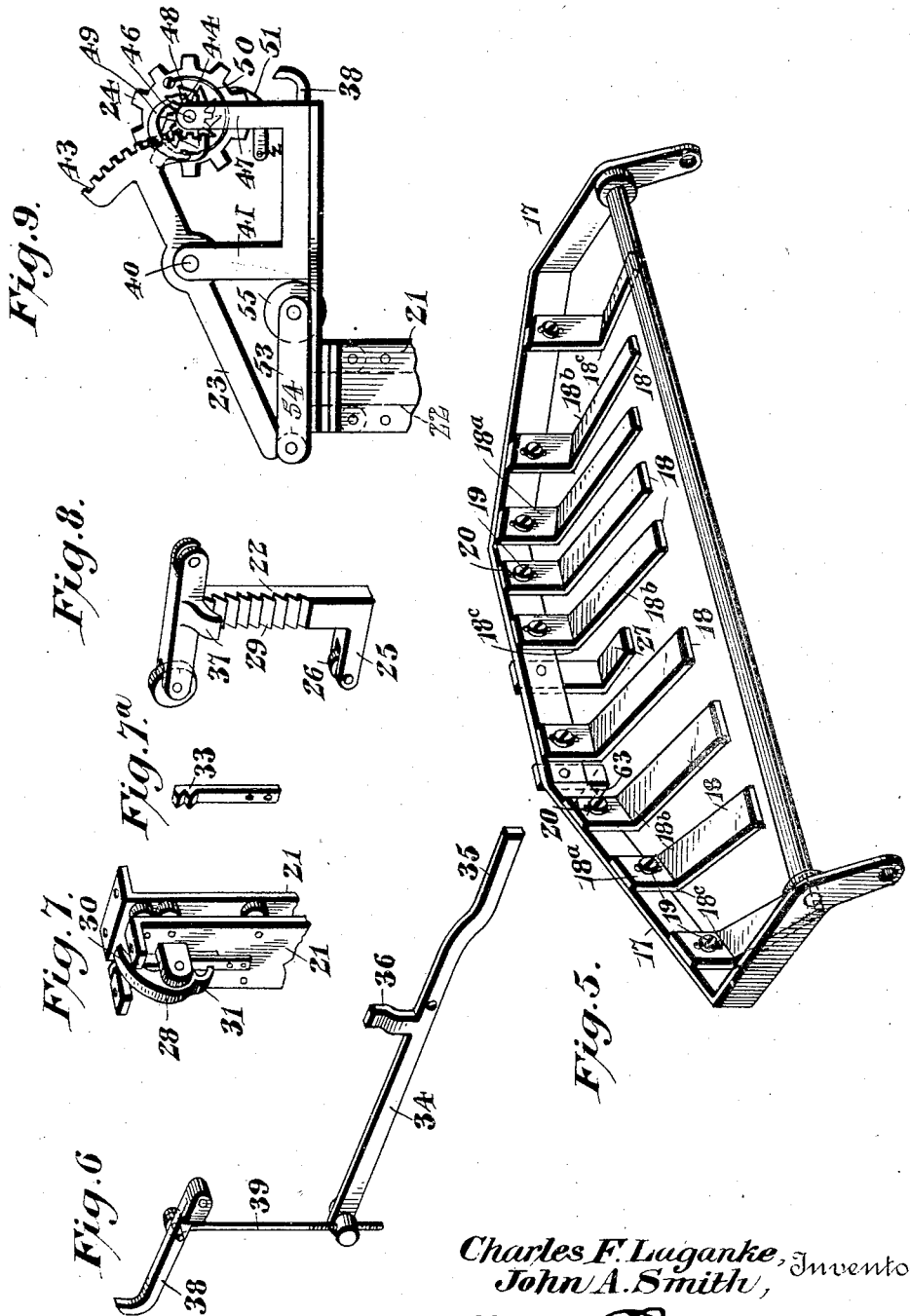

C. F. LAGANKE & J. A. SMITH.
CALCULATING AND TYPE WRITING MACHINE.
APPLICATION FILED AUG. 25, 1902.
1,070,142.
Patented Aug. 12, 1913.
9 SHEETS—SHEET 6.
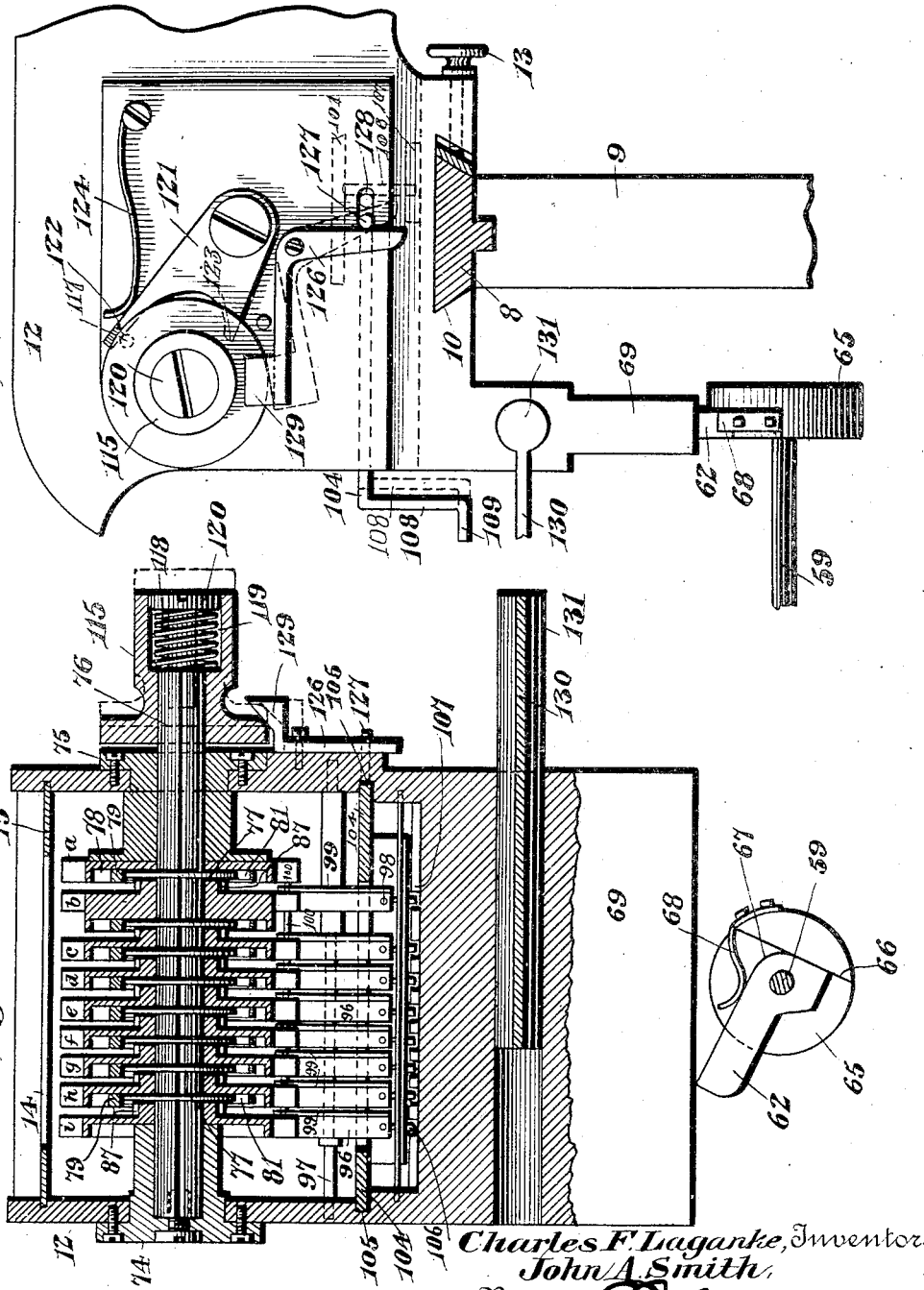

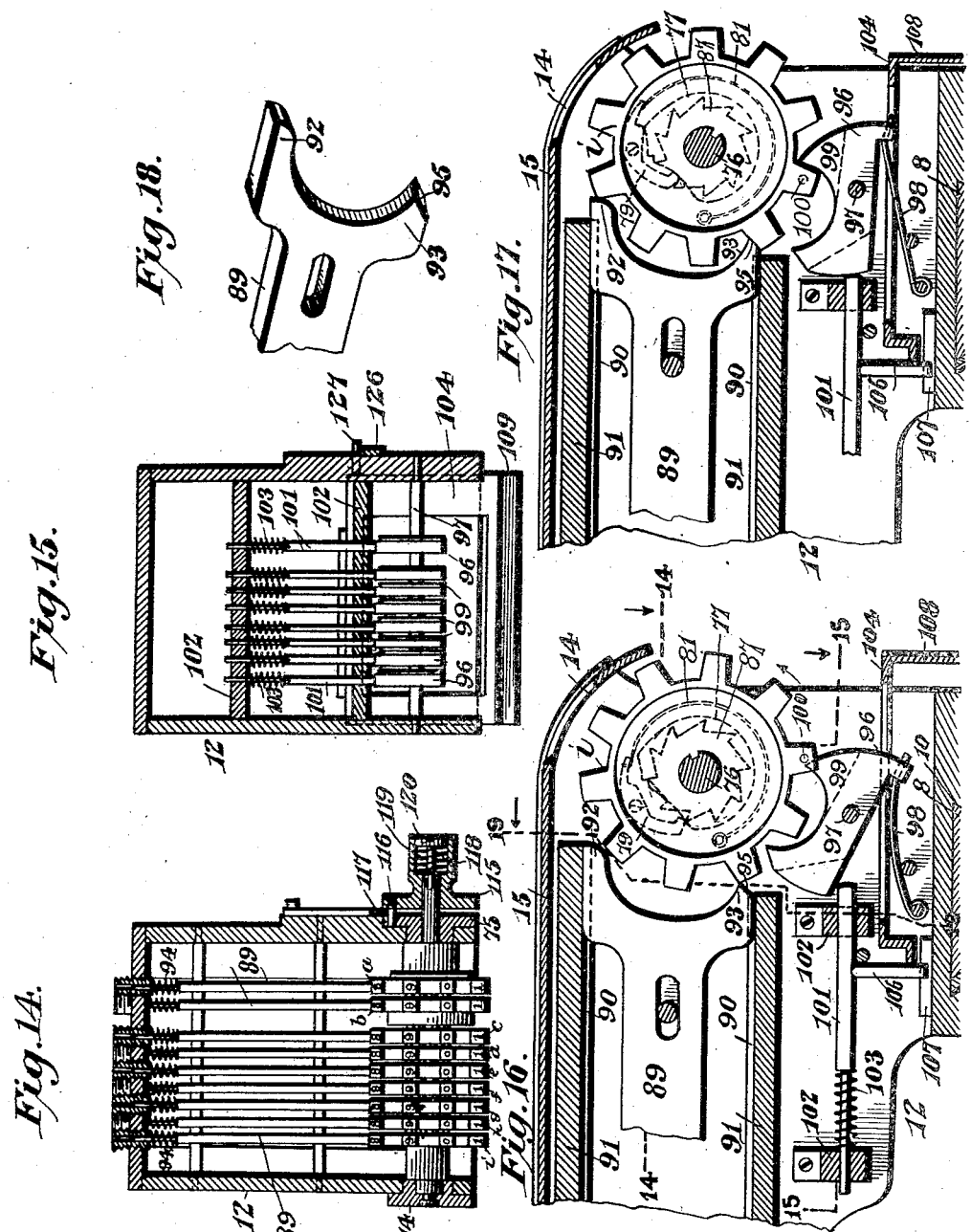

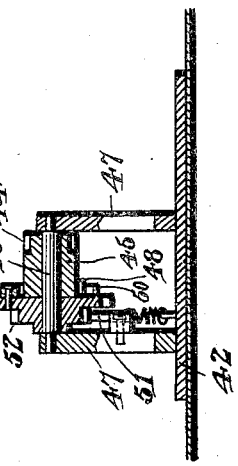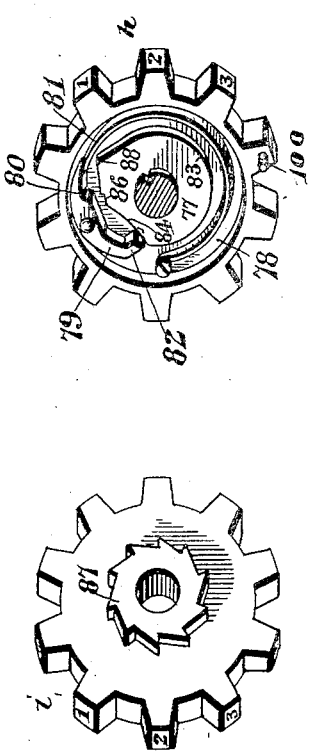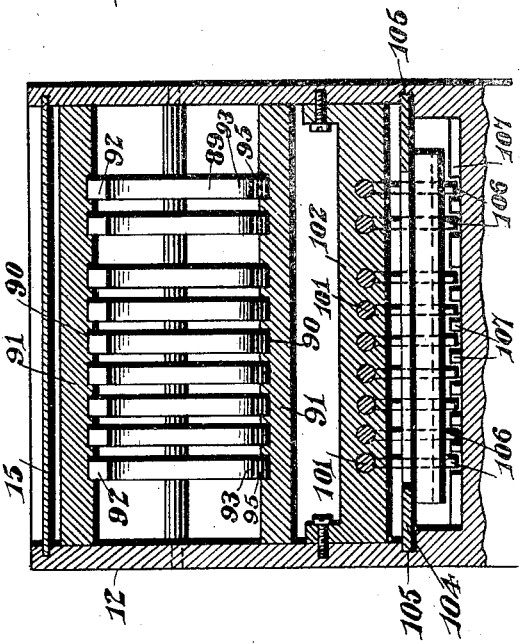

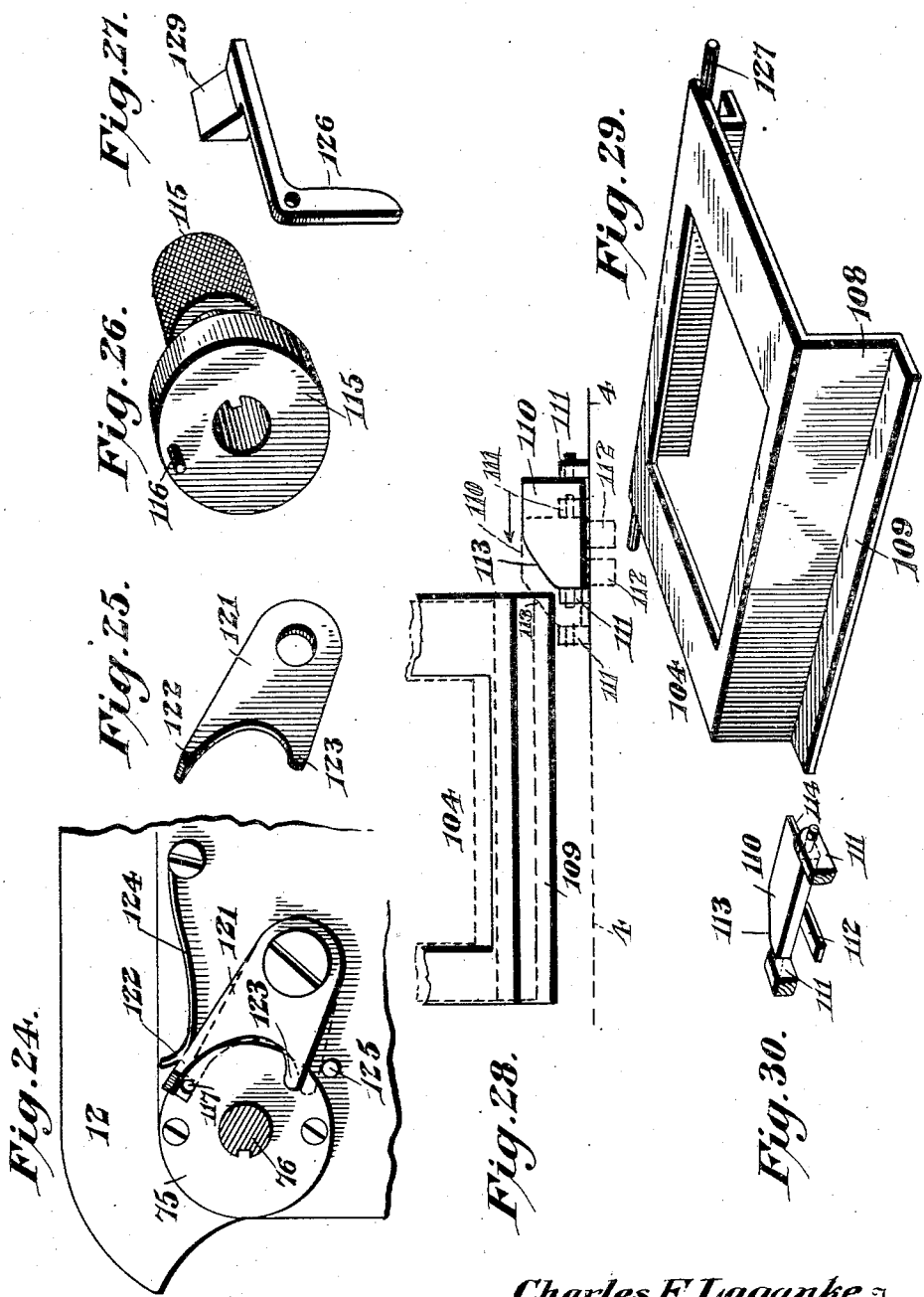

UNITED STATES PATENT OFFICE.

CHARLES FREDERICK LAGANKE AND JOHN ASBURY SMITH, OF CLEVELAND, OHIO, ASSIGNORS, BY MESNE ASSIGNMENTS, TO ELLIOTT-FISHER COMPANY, A CORPORATION OF DELAWARE.

CALCULATING AND TYPE-WRITING MACHINE.

1,070,142.   Specification of Letters Patent.   Patented Aug. 12, 1913.

Application filed August 25, 1902. Serial No. 120,925.

*To all whom it may concern:*

Be it known that we, CHARLES F. LAGANKE and JOHN A. SMITH, citizens of the United States, residing at Cleveland, in the county of Cuyahoga and State of Ohio, have invented new and useful Improvements in Calculating and Type-Writing Machines, of which the following is a specification.

This invention relates to a novel calculating machine, and also to a combined calculating and typewriting machine, in which the calculating mechanism is included as an adjunctive organization.

One object of the invention is to produce a simple, durable and accurately-operating computing device for making certain computations mechanically.

Another object of the invention is to equip a traveling carriage with the actuating member of the computing mechanism, and with operating mechanism, as for instance keys, for moving the actuator to operate the computing mechanism, and for effecting the automatic advance of the carriage to change the relation between the actuator and the elements of the computing device.

Another object of the invention is to provide, in a key-operated computing device, means for eliminating inaccuracies in the computation, resulting from a false stroke of a key.

A further object is to secure the lightest possible touch in a key-operated computing device, by means of a power - multiplying connection between the key and the number wheels, (or their equivalents) and by utilizing the full stroke of the key in connection with devices for securing a variable leverage during the transmission of movement.

A further object of the invention is to provide a positive lock for the elements of the computing mechanism, and automatically-operated means for unlocking said elements prior to their reactuation.

A further object is to effect the automatic unlocking of the number wheels through the relative movement of the computing device proper and the element supporting the actuator.

A further object is to equip a traveling carriage with number printing mechanism operated by the keys, which likewise serve to rotate a master wheel, or other actuator, mounted on the carriage and arranged to be advanced by the movement of said carriage into operative relation with the several number wheels of the computing device.

A further object of the invention, considered as a combined calculating and typewriting machine, is to cause the registration of the result of a computation mechanically effected by the depression of the typewriter keys, as, for instance, the registration of the total amount of a series of consecutive numbers printed by the machine in the usual manner, so that when said numbers have been printed, the operator may ascertain the result or total without making mental calculations and with absolute assurance of the accuracy of the computation.

A further object of the invention, considered in a still more specific aspect, is to equip a typewriting machine of that class known as flat-platen or book typewriters, with an automatic computing device or register, for the registration of totals when the machine is employed for tabulating, the device being so arranged that the calculation and consequent registration will embrace only those numbers printed in a predetermined column or in predetermined columns.

A still further object of the invention is to adjustably mount the computing device proper upon the frame of a flat-platen machine, to facilitate its being arranged in apposition to any desired column of a worksheet resting on the platen, and to mount the actuator or master wheel on the traveling carriage, so that the advance of the carriage will present the master wheel to the computing device, and feed it step by step to the several number wheels thereof, thus insuring the movement of the number wheel corresponding in order to the order or point of the column in which a given numeral is printed.

A further object is to provide automatically operated means for connecting the operating keys of the machine with the actuator when the latter is brought into coincidence with the computing device, and for disconnecting the keys from said actuator when the latter moves out of coincidence with said device, whereby the keys are relieved of any burden incident to the movement of any part of the computing mechanism, except when writing such numbers as are designed to be embraced in the computation.

Another object is to arrange for the total disconnection of the keys from the computing device or its connections, to permit the unrestricted, independent use of the typewriting machine when desired.

Other objects subordinate to those enumerated will appear during the course of the succeeding description of the illustrated embodiment of the invention.

In the accompanying drawings, Figure 1 is a plan view of our combined typewriting and computing machine, portions of the machine frame and carriage being broken away. Fig. 2 is a sectional view on the line 2—2 of Fig. 1, with certain parts in elevation and others broken away. Fig. 3 is a sectional view on the line 3—3 of Fig. 2. Fig. 4 is a sectional view similar to Fig. 2, with the computing device proper omitted, and with the parts positioned as they appear at the end of a complete stroke of a key. Fig. 5 is a detail perspective view of the actuator yoke. Fig. 6 is a detail view of the master wheel locking lever and arm. Fig. 7 is a similar view of the actuator plunger guide and dog. Fig. 7a is a detail view of the spring for the actuator plunger dog. Fig. 8 is a detail perspective view of the actuator plunger. Fig. 9 is a detailed elevation of the master wheel, the rack lever and a portion of the plunger, together with the mountings of these parts. Fig. 10 is a detail view of the rock-shaft and cam for raising the actuator yoke to disconnect the keys from the computing mechanism. Fig. 11 is a detail perspective view of the rock-shaft and cam for automatically controlling the connection between the keys and the computing mechanism. Fig. 12 is a vertical transverse sectional view through the computing device or register. Fig. 13 is a side elevation of the register with parts broken away, the retracted position of the unlocking frame and of its operating lever being shown in dotted lines. Figs. 14 and 15 are horizontal sectional views on the lines 14—14 and 15—15 of Fig. 16. Figs. 16 and 17 are vertical sectional views through the front portion of the register, showing the parts thereof in different positions. Fig. 18 is a detail perspective view of the front end of a locating plate. Fig. 19 is a sectional view on the line 19—19 of Fig. 16. Figs. 20 and 21 are detail perspective views of adjacent number wheels. Fig. 22 is a detail view of a number wheel locking dog. Fig. 23 is a detail view of a transfer cam. Fig. 24 is an elevation, partly in section, showing the position of the stop plate on the side of the register and its relation to the number wheel shaft. Fig. 25 is a detail view of the stop plate detached. Fig. 26 is a similar view of the resetting head. Fig. 27 is a detail view of the retracting lever for the unlocking frame. Fig. 28 is a detail view in plan of the front end of the unlocking frame and the unlocking cam movable with the carriage to retract the frame, certain positions of the parts being shown in dotted lines. Fig. 29 is a perspective view of the unlocking cam. Fig. 30 is a similar view of the cam plate. Fig. 31 is a detail view on a somewhat enlarged scale, showing the cam plate in an inverted position. Fig. 32 is a detail sectional view on the line 32—32 of Fig. 4, and Fig. 33 is a view showing a modification of the connection between a key lever and the yoke.

Like characters of reference are employed to designate corresponding parts throughout the several views.

It has been stated that the invention relates to a calculating or computing machine, and as the description proceeds it will be seen that viewed solely as such, the device embraces certain novel features which facilitate its operation and insure absolute accuracy of the computation. The computing device has, however, been designed with special reference to the equipment of typewriting machines, and more particularly machines of that type characterized by a flat platen, and a traveling carriage movable both longitudinally and transversely of the platen and carrying printing mechanism, including both letter and numeral types. While, therefore, the invention embraces a novel calculating device capable of independent use, as well as a device of this character considered as an attachment for typewriting machines generally, the illustrated embodiment is a combined calculating and typewriting machine including what is known as a Fisher book typewriter, as a part thereof. See Figs. 1, 2 and 3. The Fisher machine includes a machine frame 1, mounted to travel longitudinally of a flat platen A, and having front and rear carriage guides 2 and 3, which slidably support a carriage 4, movable laterally or transversely of the platen and supporting the printing mechanism. The upper portion of the carriage 4 is in the form of a casing 5, within which are mounted the key levers, having connection with the keys disposed above the casing, and downwardly-striking type-bars, located below the casing, as is well understood in the art. The carriage 4 is drawn to the right by carriage tapes 6, and its step-by-step advance in the direction of letter spacing is permitted by the operation of carriage-feeding mechanism 7, including pivoted feed yokes 7a, one at least of which is moved to operate the carriage escapement when any one of the several keys is completely depressed. The carriage-feeding mechanism 7 is indicated in Figs. 1, 2 and 3 of the drawings, and the purpose of calling attention to it in connection with the present invention is to emphasize the fact that machines of the class under discussion include a traveling carriage which supports the printing mechanism and which is advanced step-by-step the distance of one letter space whenever one of the keys is completely depressed. When a key is struck but is not completely depressed, the carriage is not advanced.

In carrying out our invention, we mount in rear of the machine frame 1 a guide bar 8, supported in parallelism with the frame by a pair of brackets 9, bolted or otherwise rigidly secured to the rear carriage guide 3 and extended upwardly to dispose the bar 8 substantially in the horizontal plane of the top of the casing 5. The guide bar is preferably of dove-tail cross-sectional contour, and engages a correspondingly formed guide groove 10, in the base 11 of the register casing 12. (See Fig. 2.) The register casing contains the computing and registering mechanism to be hereinafter described, and is adjustable along the bar 8 to dispose said mechanism opposite the column to be totalized. In the illustrated construction, the retention of the register casing in its adjusted positions is effected by means of a thumb screw 13, screwed into one side of the base 11 and impinging against a bearing strip imposed against the adjacent face of the bar 8. (See Fig. 2.)

The computing and registering mechanism, within the register casing 12, is specifically novel, and will be hereafter described in detail. For the present, however, it is sufficient to call attention to the fact that this mechanism comprehends, as is usual in this class of devices, a series of registering wheels $a$, $b$, $c$, $d$, $e$, $f$, $g$, $h$ and $i$, designed to register hundredths, tenths, units, tens, hundreds, thousands, ten thousands, hundred thousands and millions, the tenths and units wheels $b$ and $c$ being spaced apart sufficiently to provide an intermediate decimal space. Each of these wheels is provided upon its periphery with the digits, 0 to 9 inclusive, preferably formed in or upon the end faces of peripheral teeth, one digit of each wheel being observable through a sight opening 14 in the downwardly-curved front end of the top wall 15 of the register casing. Each of the registering wheels is arranged to make nine-tenths of a complete revolution independently of the other wheels of the series, to present its digits successively before the sight opening, and during its last increment of movement engages the adjacent wheel at the left and rotates it a single increment or step, after which the first-named wheel may again rotate independently for nine-tenths of a complete rotation before again advancing the adjacent wheel at the left a single step. Since the wheels of the entire series are related to one another in the manner stated, it follows that mechanical computations in addition may be effected by moving the wheels, corresponding in order to the order of the numerals composing the numbers to be added, a number of increments corresponding to the unitary values of such numerals. Thus, suppose it is desired to add 432 and 234, the ciphers of all of the wheels being disposed opposite the sight opening 14. The wheel of the third order, to-wit the wheel $e$, will be rotated four increments, presenting the numeral 4 at the sight opening; the wheel $d$ of the second order will be rotated three increments and the wheel $c$ of the first order two increments or steps. The numerals exposed before the sight opening will now read 432, corresponding to the first number. The second number 234 will now be added by imparting to the third order wheel $e$ two additional increments of movement, to the second order wheel $d$ three increments and to the first order wheel $c$ four increments, thus causing the numerals presented before the sight opening to read 666, the sum of the two numbers. Since the numerical value of each order is 10, and since each wheel during its last increment of movement will, as heretofore explained, impart a single increment of movement to the next adjacent wheel to the left, it follows that when the number registered reaches the limit of the numerical value of a given order, the rotation of the adjacent wheel will effect the registration of a numeral of the next higher order. Thus, assuming the first order or unit wheel $c$ to have been given nine increments of movement, causing the presentation of the numeral 9 before the sight opening, the next or tenth increment of movement will present the 0 on said wheel before the sight opening, and by the automatic engagement of the wheel $c$ with the wheel $d$ of the second order, the latter wheel will be moved a single increment to present the numeral 1 of the second order before the sight opening, the presentation of the two digits 0 and 1 in the first and second orders effecting the registration of the number 10.

The mechanism contained in what we have termed the register casing constitutes the computing or adding device proper, and is that part of the computing mechanism which is mounted independently of the carriage. Upon the carriage is mounted another portion of the computing mechanism, to-wit, actuating mechanism presentable to the number wheels in succession by the step-by-step advance of the carriage, and designed to rotate said wheels in proportion to the numerical value of the numerals embraced by the computation. In other words, the actuating mechanism movable with the carriage is designed to effect the differential movement of the computing device. This arrangement is one of the novel characteristics of the invention viewed as a calculating machine, since the traveling carriage supporting the operating mechanism for the number wheels is not necessarily the carriage of a typewriting machine. It is contemplated, however, to utilize a key-operated number wheel actuator, and although it is not essential that these keys be arranged to operate the printing devices, the illustrated embodiment of the invention comprehends the utilization of the numeral keys of the typewriter as operating means for the actuator.

Having a general understanding of the arrangement and mode of operation of the registering or computing mechanism proper, we may now consider the arrangement of the actuator for the number wheels, and the mechanism for effecting an operative connection between the actuator and the numeral keys of the typewriter, it being understood that the combined typewriting and computing machine to be specifically described is intended to print a series of numbers, as well as to compute and register the total of the numbers recorded.

The arrangement of the key levers within the casing 5 is such that the levers $1^a$, $2^a$, $3^a$, $4^a$, etc., of the numeral or digit keys are disposed in substantially the same horizontal plane, (see Fig. 3) and are fulcrumed intermediate of their front and rear ends, to which the keys and draw-wires are connected, as shown in Fig. 2.

Located within the casing 5 above the key levers and fulcrumed at its ends upon uprights 16, is a swinging actuator yoke 17, (see Figs. 1 to 5) to which are adjustably secured a series of contact plates 18, each located directly above a numeral key lever, and designed to be engaged by the latter to swing the yoke. Each of the numeral key levers is intended to effect the rotation of a registering wheel to an extent corresponding to the numerical value printed, and since the yoke 17 is a motion transmitting element common to the several numeral keys, these contact plates are graduated in order that the several numeral key levers will effect different degrees of movement of the yoke. These contact plates are susceptible of various modifications, since any character of connection which would cause the yoke to swing in different degree under the impulse of the various key levers would be effective. The desired end could be accomplished by merely disposing the lower or contacting edge of the yoke at an inclination, or by employing depending contact plates of different lengths, mounted upon either the yoke or the levers. In this event, however, a considerable portion of the movement of each key lever would be lost, to-wit, that initial movement of the lever necessary to bring it into contact with the under edge of its contact plate. It is desirable to utilize the full stroke of each numeral key lever for the actuation of the yoke. We therefore prefer to employ contact plates of angular construction, as best shown in Figs. 1, 2, 3 and 5. These plates comprise the angular related end portions $18^a$ and $18^b$, the formed being disposed vertically and attached to the yoke by adjusting screws 19, engaging slots 20 in the plates. This angular relation of the end portions of the plates produces what may be termed heels $18^c$ at the lower ends of the vertical portions $18^a$, and from these heels, which are disposed at graduated distances from the levers, the end portions $18^b$ of the plates extend forwardly into contact with the upper edges of the key levers adjacent to their fulcrums. See Fig. 2. When a key is depressed one of the key levers will be swung in an obvious manner, and being in contact with the end of a contact plate will immediately impart movement to the yoke. The angular relation of the horizontal portion of each contact plate with respect to its key lever is such that prior to the completion of the movement of the key lever, the latter will contact with the heel of the plate, and therefore while the complete stroke of each key lever will be utilized in the operation of the yoke, the positions of the graduated heels will determine the degree of movement of the yoke under the impulse of each key. This character of connection between the key levers and the yoke results in a considerable gain of leverage and prevents the weight of the yoke from being suddenly imposed upon the key levers during the depression of the keys. Furthermore, it will be noted that by the time the levers are brought into contact with the heels of the contact plates, after which there is obviously a decrease of leverage, the inertia of the yoke and its connected parts, including the actuator and one of the number wheels of the computing device, will have been overcome. This materially improves the touch.

Upstanding from the bottom of the casing 5 are a pair of parallel plates 21, secured in any suitable manner and constituting a plunger guide, within which is mounted for vertical reciprocation a plunger 22, designed to be operated by the yoke and arranged in turn to swing a rack lever 23, mounted above the casing and geared in a manner to be described to the master wheel or actuator 24 of the computing mechanism. At the lower end of the plunger 22 is formed an angular arm 25, carrying an anti-friction roller 26, disposed in the path of a plate 27 secured to the yoke, preferably at the center thereof. (See Fig. 2.) When the yoke is elevated by the depression of a key, the plunger will be raised in an obvious manner, and will be dogged by a pivoted plunger dog 28, mounted on the plunger guide and disposed to engage a rack 29, formed in one side face of the plunger. (See Fig. 8.) It should be noted at this point that if a key is partially depressed and then released, it will effect the partial elevation of the plunger, which, however, will not drop back, but will remain in its partially elevated position, so that if the key is again struck for the purpose of rectifying the false or incomplete stroke, the movement of the plunger, and consequently of the rack lever and actuator, will be only such movement as would have been imparted to these elements had the key been properly depressed in the first instance.

At the end of the dog 28 opposite its rack-engaging beak 30, is formed a tail piece 31, and at an intermediate point is formed a projection 32, (see Fig. 3) engaged by a spring 33, which serves to retain the dog in either its engaged or disengaged position. While one of the objects of this construction is to prevent the retraction of the plunger before the latter has completed its movement, it is necessary to provide for its retraction after it has been properly operated by the complete depression of a key. For this reason we mount upon one side of the plunger guide a lever 34, having its front end 35 located in the path of that yoke 7ª of the carriage-feeding mechanism, which is operated to effect the letter spacing of the carriage upon the complete depression of one of the numeral keys. This relation of parts is clearly shown in Fig. 2 of the drawings, wherein one of the numeral key stems is shown provided with a pin 7ᵇ, disposed above the yoke 7ª, which is in turn disposed above the front end of the lever 34.

Upon the lever 34 is formed an upstanding releasing finger 36, which, when the lever is swung by the yoke 7ª, will contact with the tail piece 31 of the dog to disengage the latter from the rack 29, and thus permit the plunger to descend to its normal position. During the descent of the plunger the dog will be held out of engagement therewith by the spring 33, but upon the complete retraction or descent of said plunger, a projection 37, located at the upper end thereof, will contact with the dog to restore the engagement thereof with the rack, so that upon the next upward movement of the plunger it will be dogged in the manner described. It will be noted that the relation of the front end of the lever 34 to the yoke 7ª is such that the lever will not be moved until immediately prior to the complete depression of the key. Therefore, the lever will not be moved until a completely effective movement of the actuator has been assured. That is to say, the described relation of these parts is such that the lever 34 will not be moved to release the dog from the plunger, nor will the yoke 7ª be moved sufficiently to operate the carriage-feeding mechanism, unless the key is completely depressed. Should a key be given a false stroke, the master wheel or actuator would be given a corresponding rotary movement and retained by the dogging of the plunger. As the false stroke would be insufficient to operate the carriage-feeding mechanism, the master wheel would still remain opposite the proper number wheel, and the subsequent complete depression of the key to rectify the false stroke would simply result in completing the proper rotary movement of the master wheel, and in feeding the carriage one letter space, to position the master wheel opposite the number wheel of next lower order.

Besides its function as a plunger-releasing device, the lever 34 constitutes an actuator for a swinging locking or checking arm 38, mounted above the casing and arranged to engage the master wheel or actuator 24, for the purpose of preventing undue movement of the latter. The arm 38 is pivotally connected at a point adjacent to its axis with the upper end of a link 39, having its lower extremity connected to the rear end of the lever 34. Thus, when said lever is operated by the yoke 7ª, in the manner heretofore described, it not only effects the release of the dog from the plunger, but also swings the arm 38 into engagement with the master wheel, as shown in Fig. 4, thereby preventing the momentum of the master wheel from urging it beyond the proper point, which would obviously result in an exaggerated movement of the engaged number wheel.

The actuating or rack lever 23 is fulcrumed on a short horizontal shaft 40, supported by posts 41, constituting elements of a supporting frame, the base plate 42 of which is bolted or otherwise secured to the top of the casing 5 at the rear side thereof, the front end of said plate being preferably supported directly over the plates 21 constituting the plunger guide. At the rear end of the lever 23 is formed a segmental rack 43, meshing with a pinion 44, formed upon or rigidly attached to a short horizontal sleeve 45, mounted to rotate upon a short shaft 46, extending between posts 47 upstanding from the rear end of the base plate 42. (See Figs. 2, 9 and 32.) At the end of the sleeve 45, opposite the pinion 44, is formed or attached a ratchet wheel or disk 48, (see Fig. 9) the teeth of which are designed to be engaged by a pawl 49, carried by the master wheel 24 and urged toward the ratchet wheel by a spring 50.

The master wheel 24 is mounted upon the shaft 46 beyond one end of the sleeve 45, and is intended, as heretofore explained, to mesh with successive registering wheels as the carriage is advanced in the direction of letter spacing. Reverse rotation of the master wheel is prevented by a pawl 51, preferably mounted upon one of the posts 47 and engaging a ratchet disk 52, fixed to the master wheel and having its teeth disposed oppositely to the teeth of the ratchet wheel 48.

The depression of one of the numeral or digit keys of the typewriter effects more or less elevation of the yoke and plunger through the swinging of a key lever, and the consequent elevation of the rear end of the rack lever 23, engaged by the plunger, will depress the segmental rack 43, as indicated by the arrow in Fig. 2. The depression of the rack will rotate the pinion 44, and the ratchet wheel 48 moving with said pinion will engage the pawl 49 to rotate the master wheel, and thereby impart movement to one of the registering wheels, the extent of such movement corresponding of course to the movement imparted to the yoke by the particular key lever actuated.

It has been stated that the minimizing of the load imposed upon the keys by the computing mechanism is a material consideration, and we have seen that with this end in view a peculiar character of shifting connection has been provided between the key levers and the actuator yoke. Attention is now directed to a connection of similar character between the plunger and the rack lever 23, with the same end in view. At the upper end of the plunger 22 is located a horizontal head 53, provided at its front end with a comparatively small anti-friction roller 54, arranged to engage the front end of the lever 23, and at its rear end with a larger roller 55, which after predetermined movement of the plunger and lever contacts with the latter adjacent to its fulcrum. Thus, during the initial movement of the parts a considerable leverage is secured, and the decrease of such leverage, occasioned by the shifting of the connection from one end to the other of the head 53, does not occur until the inertia of the parts has been overcome. For the purpose of succinct definition, it may be said that the connection between the keys and the actuator is variable, and includes means for varying the leverage exerted upon the actuator by the keys. For the same purpose it may also be said that the connection between the keys and the actuator includes means independent of the keys for preventing exaggerated movement of the actuator when a key is given a false or insufficient stroke and is subsequently depressed the proper distance.

For the purpose of retracting the rack lever 23 and the combined locking and releasing lever 34, suitable springs 56 and 57 are provided. The touch is further improved by the provision which has been made for substantially counterbalancing the actuator yoke 17 and the plunger 22, the lower end of which latter, as heretofore explained, rests upon the plate 27 fixed to the yoke. The present embodiment of the counterbalancing means comprises one or more springs 58, secured at their lower ends, as, for instance, to the uprights 16, and bearing at their upper ends against the under side of the yoke, as shown in Figs. 2 and 4.

Notwithstanding the fact that the peculiar character of connection between the keys and the actuator reduces to a minimum the resistance opposed to the depression of the keys, it is nevertheless desirable to provide means for automatically removing the elements of the computing mechanism and its operating connections entirely out of operative relation with the keys and key levers whenever the actuator moves out of coincidence with the computing mechanism proper, and for reëstablishing the operative connection between the keys and the actuator whenever the latter arrives in position to operate a number wheel. Various devices for accomplishing this end might be employed, but by preference a rock-shaft 59 is journaled in a sleeve-bearing 60 at the rear end of the casing, and is provided at its opposite ends with a yoke-elevating cam 61 and a trip arm 62. The cam 61 is disposed to engage the under side of a fixed part of the yoke 17, as, for instance, the horizontal portion of an angular plate 63 secured thereto. Encircling the rock-shaft is a spring 64, secured at its opposite ends to the sleeve 60 and the cam 61, respectively, and tending constantly to urge the cam in a direction to elevate the yoke 17, for the purpose of removing the operating connections of the computing device entirely out of the paths of movement of the key levers. The trip arm 62, located at the rear end of the shaft 59 is mounted loosely thereon adjacent to one side face of a head 65, fixed to the shaft and provided with a ledge 66 opposed to one end of the arm 62. This ledge constitutes a stop, limiting the movement of the arm 62 relative to the shaft 59 in one direction, but such independent movement of the arm in the opposite direction is permitted by the rounding of one corner thereof, as indicated at 67. (See Fig. 11.) The retention of the arm in its normal position is insured by a spring 68, secured at one end to the head and bearing against one side of the arm. When the master wheel is not located opposite the register casing, that is to say, when the printing point of the machine is located either in advance of or beyond the column which is being totalized, the cam 61 will hold the yoke 17 out of engagement with the key levers, so that no resistance whatever will be opposed by the computing mechanism to the numeral keys when the latter are depressed for the purpose of printing numbers other than those embraced within the desired computation. When, however, the advance of the carriage brings the master wheel adjacent to what in the present embodiment of the computing mechanism may be called the totalizer, the upper end of the trip arm 62 is brought into contact with a trip flange 69, preferably depending from the front of the register casing. (See Fig. 2.) As the carriage continues to advance the trip arm will be swung back, and as its independent movement is prevented by the ledge 66, the rock-shaft will be rotated and the cam 61 turned down to a horizontal position, for the purpose of restoring the operative relation between the actuator yoke 17 and the key levers by the time the master wheel moves into operative relation with the number wheel of highest order. This relation of the parts will be maintained while the master wheel is traversing the series of number wheels, because the trip arm will be in engagement with the bottom wall of the flange 69, and will not pass therebeyond until the master wheel has moved out of coincidence with the number wheel of lowest order. When, however, the master wheel has moved beyond the totalizer, and the trip arm has moved beyond the flange by reason of the step-by-step advance of the carriage, the spring 64 will restore the yoke-elevating cam 61 to its normal position to again relieve the numeral key levers of any unnecessary burden. During the retraction of the carriage to begin a new line of writing, the trip arm 62 will again contact with the trip flange 69, but instead of rocking the shaft 59 as before, will rock independently of the shaft in opposition to the spring 68, which latter will restore the arm to its normal upright position when the flange has been passed. Thus the machine may be said to comprehend a computing device, an actuator therefor, a series of keys normally out of operative relation with the actuator, a traveling carriage, and means for automatically effecting an operative relation between the keys and the actuator when the latter is presented to the computing device during the advance of the carriage.

In addition to the automatic means for elevating and depressing the yoke 17, we provide a second yoke-elevating cam 70, opposed to the under side of the yoke, preferably at one end thereof, and mounted upon a manually-operated rock-shaft 71, journaled in a bearing sleeve 72 and extended through one end of the casing 5, beyond which it is provided with a knurled head 73. The cam 70 constitutes manually-operated means for totally disconnecting the keys from the computing mechanism when it is not desired to utilize the latter.

It will be noted that the outer end of the cam 70 is flattened so that when the cam is turned to an upright position the engagement between this flattened end surface and the yoke will serve to retain the finger piece or key 73 in the position to which it has been moved. Similarly the cam is held in its depressed position by the yoke 17, as shown in Fig. 3. It will thus be seen that in addition to the automatic means for causing an operative connection to be established between the computing device and the keys, the shaft 71, key 73, and cam 70, constitute means including a key for rendering the automatic key connecting mechanism ineffective, since when the yoke 17 is held elevated by the cam 70, the automatic mechanism, including the structure shown in Fig. 11, will be ineffective to establish an operative relation between the register and the numeral keys.

Before proceeding with the specific construction of the totalizer or computing device proper, we will consider briefly the operation of the mechanism thus far described.

It is well understood by those skilled in the art that type-writing machines of the class under consideration are employed largely for making out bills or statements, and for general tabulating purposes. In work of this character, more or less matter is type-written upon the work-sheet, and numbers are arranged in one or more columns. When the matter to be written has been entered, the machine is shifted, and stopped (by what are known as tabulator stops) in proper position to print in a given column. It is for the purpose of mechanically computing the total of the numbers printed in any given column, that the present form of computing and registering mechanism is provided. It is therefore designed to effect the actuation of the registering device only when the numeral keys are depressed for the purpose of printing in the column. Assuming now that a bill is to be made out, the work-sheet is properly positioned upon the platen and the computing device or totalizer is shifted along the guide bar 8, and fixed in position to have its number wheels engaged by the master wheel mounted on the carriage, when said carriage is moved to a position to print in the column to be totalized. That is to say, the register is so adjusted that when the printing point of the carriage is in position to print a numeral of the seventh order, to-wit, millions, in the column, the master wheel will be in mesh with the number wheel of corresponding order, to-wit, $i$. The totalizer having been positioned, the machine will be operated in the usual manner to print any desired digit upon the bill to the left of the column, the operating connections of the actuator opposing no resistance whatever to the depression of the numeral keys, for the reason that the yoke 17 is held in its elevated position by the cam 61. As the carriage advances step-by-step to the right and approaches the column to be totalized, the trip arm 62 will engage the trip flange 69, and as the carriage is further advanced to bring the master wheel into coincidence with the number wheel $i$ of highest order, the rock-shaft 59 is rocked to depress the cam 61, and thus lower the yoke 17 to establish an operative connection between the contact plates and the numeral key levers. If in this position of the carriage, a key is depressed to print a numeral of the millions order, the wheel $i$ will be rotated a distance proportionate to the unitary value of the numeral printed. Thus, if the 2 key is depressed the key lever $2^a$ will be oscillated, and being in engagement with the front end of one of the contact plates 18 will elevate the yoke 17 and with it the plunger 22. The elevation of the plunger will swing the rack lever 23, the depression of whose rack will rotate the master wheel, which, being in mesh with the number wheel $i$, will rotate the latter two increments, causing the registration of the digit 2 in the order corresponding to the order in which the same numeral is printed in the column. During the initial depression of the key, great leverage will be exerted by it, because the yoke will be connected to the key lever closely adjacent to the fulcrum of the latter, and the rack lever will be connected at a comparatively great distance from its fulcrum with the upper end of the plunger. As the downward movement of the key continues, the connections referred to will be shifted by the contact of the key lever with the heel of the contact plate, and by the engagement of the rack lever with the antifriction roller 52 at the rear end of the plunger head 53. This shifting of the connections will cause a decrease of the leverage exerted by the key, but the shock incident to such decrease will be minimized, if not entirely eliminated, by reason of the impetus gained by the parts. As the key moves down, the pin $7^b$ thereof will contact with the yoke $7^a$ of the carriage-feeding mechanism, and, oscillating the yoke in a manner well understood in the art, will bring it finally into contact with the front end of a lever 34. The lever will thus be swung just as the key reaches its completely depressed position, and will present the checking or locking arm 38 to the master wheel, to prevent the overrunning of the latter under the impetus gained during the stroke of the rack lever. The swinging of the lever 34 by the yoke $7^a$, in addition to presenting the arm 38 to the master wheel, will bring the releasing finger 36 into contact with the tail piece of the plunger dog 28, thus disengaging the dog from the plunger to permit the gravitation of the latter when the pressure has been removed from the key. Upon the release of the key the yoke $7^a$ will return to its normal position, causing the carriage feeding mechanism to advance the carriage the distance of one letter space, and releasing the lever 34, to permit its retraction and the consequent movement of the arm 38 out of engagement with the master wheel, and the removal of the releasing finger 36 from the tail piece of the dog. At the same time, the yoke and the plunger will drop back to their depressed positions, which will permit the retraction of the lever 23 without effecting any movement whatever of the master wheel, and will bring the projection 37 at the upper end of the plunger into contact with the beak of the dog, for the purpose of restoring an engaging relation between the dog and the plunger preliminary to a repetition of the described operation. In the event of a false stroke of a key, the incomplete depression of the latter will elevate the yoke and plunger, and thus operate the master wheel and the adjacent number wheel to an extent corresponding to the depression of the key. When the key is released the plunger will not be retracted, but will be dogged in its elevated position, and the carriage will not advance but will retain the master wheel in engagement with the number wheel which has been insufficiently rotated. The reason for this is that the movement of the key will not be sufficient to completely depress the yoke $7^a$ of the carriage-feeding mechanism, and the latter will not therefore effect the advance of the carriage, nor will the lever 34 be operated to release the dog. The failure of the carriage to advance will apprise the operator that a false stroke has been made, and upon the key being restruck in the proper manner it will merely complete the predetermined movement of the number wheel, by the elevation of the plunger beyond the point to which it has already been moved. The utility of the mechanism for dogging the plunger will now be apparent, as it will be seen that if the plunger were permitted to return after having moved the number wheel under the impulse of a false stroke, it would subsequently add to such false movement of the wheel a movement corresponding to the full value of the numeral printed. Such exaggerated movement of the number wheel would necessarily result in an inaccurate computation. Having printed and registered 2, and having by such operation caused the advance of the carriage one letter space, the master wheel will be presented to the number wheel of next lower order, in correspondence with the shifting of the printing point of the machine to the point of next lower order in the column. If now a numeral key is sufficiently depressed, another number will be printed and registered, and the machine will be again advanced in the manner described, it being obvious that if a 0 is printed the registering mechanism will not be operated, because the key lever of the 0 key is never operatively related to the yoke 17. The carriage and master wheel will nevertheless be shifted in such case, for the purpose of maintaining the correspondence between the number wheels and the printing point. As the machine continues to advance to the right the master wheel will finally pass beyond the series of number wheels, and the trip arm 62 will pass from under the flange 69. As soon as this occurs the yoke 17 will be thrown up automatically, as heretofore explained, to relieve the key levers of any burden during the operation of the machine to print upon the work-sheet beyond the column. When the end of the line is reached the carriage is retracted or drawn back to the left in the usual manner, the arm 62 rocking loosely on the shaft 59, to permit it to pass under the flange 69 without dropping the yoke.

It should be noted at this point that one of the characteristic features of the illustrated embodiment of our invention includes a computing device, adjustable independently to enable it to be positioned in proper correspondence with a column to be totalized, and also includes a traveling carriage, supporting actuating mechanism for the totalizer or computer and designed by its movement to present said actuating mechanism to the number wheel corresponding in order to the position of the printing point of the typewriting machine.

The device has been fully described and its operation explained without reference to the specific construction of the totalizer or computing device *per se*, because it is evident that the primary objects of the invention may be attained by the employment of any character of computing mechanism, provided it includes a series of registering wheels, or their equivalents, and means whereby the complete rotation of any wheel will be accompanied by a single increment of movement of the adjacent wheel of higher order. Nevertheless, the invention comprehends in a subordinate aspect thereof the employment of novel computing mechanism, positive in action and simple and durable in construction, and this mechanism we shall now proceed to describe in detail.

Within alined openings in the side walls of the casing 12, are located bearing collars 74 and 75, within which is journaled the number wheel shaft 76, rotatably supporting the several number wheels. (See Fig. 12.) This shaft is normally stationary, and upon it are fixed a series of substantially disk-shaped transfer cams 77, one of which is located within the recessed side face of each wheel, with the exception of the wheel *i*. Each wheel, with this exception, is provided, upon the bottom face 78 of its recess, with a pivoted transfer pawl 79, (see Figs. 12, 16, 17 and 21) having a tail-piece 80, urged outwardly by a flat spring 81 and formed at its opposite end with a beak 82. The major portion of each transfer cam is concentric with the shaft 76, but between the opposite ends of this plain portion 83 of the cam is formed a depression 84, at one end of which is defined an angular resetting notch 86. The relation of each transfer pawl to its cam when the wheel carrying the pawl is registering 0, is shown in Fig. 16. Assuming the wheel shown in this figure to be the wheel *g*, to the right of the wheel *f* with which the actuating wheel is engaged, it will be seen that the rotation of the latter in the direction of the arrow will cause the beak 82 of its transfer pawl (shown in dotted lines) to ride upon the plain face 83 of the cam during eight increments of movement of the wheel, that is to say, while the numbers 1 to 8 are successively presented before the sight opening. At the end of the eighth increment of movement, the beak will drop into the resetting notch 86, and during the next or ninth increment of movement (which presents the digit 9 of the wheel *f* to the sight opening) the beak of the pawl will travel down into the depression 84 of the cam to engage a tooth of a ratchet wheel 87, formed (as shown in dotted lines) upon the adjacent side face of the number wheel *g* of next higher order. Thus, an engagement will be effected between the two wheels, (see Fig. 17) so that as the final increment of movement is imparted to the wheel *f*, a corresponding increment of movement will be imparted to the wheel of next higher order, to-wit, the wheel *g*. The springs 81 are employed for the purpose of holding the beaks of the transfer pawls against the edges of the cams, but the positive engagement of each pawl with a tooth of the adjacent ratchet wheel at the proper time, is effected by a slight swell or projection 88, formed on each transfer cam adjacent to the resetting notch thereof. (See Figs. 17 and 23.) As the beak of the pawl approaches the depression 84 of the cam, its tail piece rides upon the projection 88, which positively swings the beak of the pawl into the depression to engage the tooth of the adjacent ratchet disk as the pawl advances.

It will be noted by reference to Figs. 16 and 17, that the transfer cams are of greater diameter than the ratchet wheels 87, except where said cams are depressed to provide for the projection of a single tooth to be engaged by a pawl when the latter is moved down to the bottom of the depression 84 in the manner heretofore stated. It will therefore appear that during the last increment of movement of the wheel f, the beak of its pawl will be moving up one inclined side of the depression, and will thus be disengaged from the tooth of the ratchet wheel before the next increment of movement of the wheel f is commenced. By reason of this relation of the parts, each cam will serve to hold the pawl of its wheel out of engagement with the ratchet disk of the adjacent wheel, except during the tenth increment of movement, so that each wheel will have independent movement for nine-tenths of each complete rotation, and will have coöperative engagement with the next adjacent wheel to the left during the final tenth of each rotation.

For the purpose of locating the registering wheels with accuracy, so that the digits will always be disposed in exact alinement before the sight opening 14, we provide what may be termed locating plates 89, disposed to slide in suitable guideways 90, formed in horizontal guide plates 91, secured rigidly within the casing 12. (See Figs. 16, 17 and 19.) One of these plates is provided for each number wheel, and each plate is formed at its front end with a pair of pallets 92 and 93, which engage the teeth of the adjacent number wheel in a manner to locate the latter accurately in proper position and to hold it until positively rotated by the master wheel or by the adjacent number wheel. The function of these plates 89 will be clear when it is considered that the transfer pawl engaging a tooth of an adjacent wheel must move entirely out of contact with said tooth by the time the wheel carrying the pawl completes its revolution. It is therefore clear that unless locating means other than the pawl is provided, the final movement of the wheel, to which motion is communicated by the pawl, would be uncertain, by reason of the precarious engagement between the pawl and the tooth at such time, and there would be some consequent uncertainty as to the accurate location of the driven wheel. The locating plates are therefore so constructed that after the pawl of what may be termed a driving wheel positively moves the engaged or driven wheel a given distance, said driven wheel will be moved positively by its locating plate independently of the pawl, so that while both wheels will be positively located, the edge of the engaged tooth will have entirely disappeared within the edge of the cam by the time the movement of the pawl is completed. By reference to Fig. 17, it will be seen that when the beak of a pawl is in engagement with the tooth of the adjacent wheel and is ready to propel the latter, the pallets 92 and 93 will be in engagement with the teeth of the wheel to be driven, to hold it in position until positively actuated. If now the driven wheel is positively rotated by its engagement with the driving wheel carrying the pawl, its locating plate will be forced rearwardly against the resistance of a spring 94, one of which is provided for each of the plates. The plate, being thus moved back to the position shown in Fig. 16, will permit the rotation of the driven wheel, and just before the latter has reached the end of its increment of movement, and while the pawl is still in engagement with the ratchet tooth, the upper corner of one of the peripheral teeth of the driven wheel (see x, Fig. 16) will pass the point of the pallet 93 and will be presented to an inclined impulse face 95, formed on the pallet. The impulse face 95, being inclined with respect to the direction of movement of the locating plate, will, as said plate is urged toward the wheel, compel the downward movement of the engaged tooth a sufficient distance to accurately locate the wheel, and to cause the ratchet tooth thereof to be entirely disengaged from the beak of the pawl and to be withdrawn within the edge of the cam disk. When the plate 89 has finally come to rest after locating the wheel, the upper and lower pallets 92 and 93 will be in engagement with the teeth of the wheel, as shown in Fig. 17, to hold said wheel in its properly located position.

The locating plates just described will tend with more or less effectiveness to hold the number wheels, and to prevent overrunning or exaggerated movement of any wheel operated from a wheel being driven by the actuator. It is found, however, that any retaining device which depends upon a spring or the like to urge it into its locking position is not effective at all times. For instance, if a number wheel is registering 3, and is again operated by the depression of the 9 key, it will rotate at high speed for nine increments, or nine-tenths of a complete revolution. During the seventh increment of this movement its transfer pawl will pick up the adjacent wheel to the left, moving said wheel with such speed that the action of a spring-urged locking element would be too tardy to arrest and lock the wheel in time to prevent the impetus gained thereby from effecting its exaggerated movement. Of course a spring of great power would perhaps effect the proper locking of the wheel, but the employment of such spring is impractical, if not impossible, because of the load which would be imposed thereby upon the numeral keys in consequence of the resistance which would be opposed by the locking device to the rotation of the number wheels. In view of these considerations we have devised positively-operated locking mechanism for the number wheels. This mechanism includes a series of locking dogs 96, one for each of the number wheels with the exception of *a*, as this wheel is never operated by movement transferred from another. These dogs are located below the wheels and are mounted on a shaft 97, extending between the side walls of the casing 12. Each dog is yieldingly urged to its disengaged or unlocked position by a spring 98. In such position of the dog a thin trip plate 99, located at one end thereof, extends in a plane between the wheel served by the dog and the adjacent wheel of next lower order. This disposition of the trip plate brings it into the path of movement of a trip pin 100, extending laterally from a tooth of the wheel of lower order. In the present embodiment of the invention, each trip pin extends from that tooth of the number wheel which bears the digit 4, in order that said pin will engage the trip plate of a dog during the movement of the wheel carrying the pin, from 9 to 0. We have already seen that the movement of any number wheel from 9 to 0 will be accompanied by a single increment of the adjacent wheel of higher order, and it will now be observed that since the trip pin 100 engages the trip plate of a dog during this same interval, the result will be that when any wheel moves from 9 to 0, it will advance the adjacent wheel, and will at the same time operate the dog of said wheel to lock it positively when its single increment of movement has been completed. This will be clear by reference to Figs. 16 and 17. In Fig. 17 the wheel *g* is about to be advanced one increment by the wheel *f*, whose transfer pawl is shown in dotted lines. As the wheel *f* advances under the impulse of the master wheel, its pawl will pick up and advance the wheel *g*, and its trip pin 100 will engage the trip plate 99 of the dog 96, serving the wheel *g*, so that the dog will be rocked against the resistance of the spring 98, and will have its rear end thrown up to its engaging position, as shown in Fig. 16. This movement will occur just as the impulse face 95 of the locating plate of the wheel *g* is about to advance for the purpose of locating the wheel. Therefore, the advance of the locating plate will assure the complete movement of the wheel *g*; and the dog will prevent excessive movement thereof, one tooth of the wheel being rigidly retained between the engaging end of the dog and the impulse face of the locating plate. It should be noted at this point that as the dog is swung to its engaging position, the trip pin which has imparted positive movement to it will pass over and beyond the trip plate to the position indicated in Fig. 16. At this time the wheel carrying the pin, as for instance the wheel *g*, will be registering 0, and may therefore be again rotated nine-tenths of a complete revolution before coming into contact with the trip plate of the dog, in the event that said dog has in the meantime been restored to its unlocked or disengaged position. Since the passage of the trip pins beyond the trip plates of the dogs would obviously permit said dogs to be immediately retracted by their springs, it is desirable to provide means for holding the dogs in their engaged positions. The illustrated embodiment of such means comprehends the employment of a series of dog-retaining plungers 101, mounted in suitable guides 102, extending across the casing 12 and urged forward by springs 103, each encircling a plunger and bearing at its ends against one of the guides and a shoulder formed on the plunger, respectively. When the dogs are in their unlocked positions, as indicated in Fig. 17, they are disposed to hold the plungers in their retracted positions, but immediately upon the movement of a dog to its engaging position, its plunger moves forward to engage the under side of the elevated end of a dog and thus prevents its retraction when the trip pin moves beyond the plate. As the number wheels are operated in succession during the travel of the carriage in the direction of letter spacing, such of said number wheels as are advanced by transferred movement will be positively locked by the dogs and will remain locked during the advance of the carriage, since it is evident that no number wheel can be twice operated by movement transferred to it from another number wheel during a single travel of the actuator across the totalizer. It is necessary, however, to unlock the number wheels before another number is added to that already registered, since it would otherwise be impossible to rotate the wheels by either transferred movement or by the direct action of the master wheel. Many ways of accomplishing the desired end might be suggested, since the simple retraction of the dog-retaining plungers 101 would permit the springs 98 to instantly retract the dogs. We prefer, however, to provide automatically-operated means for unlocking the number wheels upon the retraction of the carriage. The illustrated embodiment of the unlocking mechanism comprehends the employment of an unlocking frame 104, mounted to slide in horizontal guide grooves 105 formed in the sides of the casing, and engaging at its rear end a series of pins 106, depending from the plungers. The pins 106 are received at their lower ends within guide grooves 107, designed to prevent their lateral displacement. The unlocking frame 104 is of light open form, and is provided at its front end with a vertical flange 108, at the lower edge of which is located a horizontal ledge 109. (See Figs. 2, 13, 16, 17, 28 and 29.) By moving the unlocking frame rearwardly to the position indicated in Fig. 17, and in dotted lines in Fig. 28, such of the plungers 101 as are in their forward positions will be retracted, permitting the dogs to drop back out of engagement with the wheels. This movement of the frame may be effected manually, but since, as heretofore explained, its automatic retraction is contemplated, we provide what may be termed an unlocking cam 110, in the form of a plate movable with the carriage and preferably hinged between a pair of ears 111, projecting rearwardly from the base plate 42 of the supporting frame for the actuator. The cam 110 is normally retained in a horizontal position by a stop lug 112, projecting from the hinged edge thereof and engaging the under side of the plate 42. (See Figs. 2, 4 and 28.) In this position of the cam it is disposed in the horizontal plane of the ledge 109 of the unlocking frame, and when retracted with the carriage its inclined face 113 contacts with one corner of the ledge, and consequently forces the unlocking frame rearwardly as the retraction of the carriage continues. (See Fig. 28.) Thus, whenever the carriage is retracted after having advanced the master wheel of the computing mechanism across the series of number wheels, said wheels will be automatically unlocked, and may be again operated in the manner heretofore described, as the carriage progresses in the direction of letter spacing. It is evident that as the carriage advances, the unlocking cam 110 must not occupy an obstructing position with respect to the unlocking frame, as this would prevent the forward movement of the frame, and the retaining plungers would in consequence be prevented from moving forward to retain the dogs. It is for this reason that the cam is hinged to permit it to occupy a position above the ledge 109, during the advance movement of the carriage. The under side of the cam 110, at the end thereof opposite the inclined face 113, has a beveled face 114, which rides up on the left-hand end of the ledge 109, and thus elevates the unlocking cam to permit it to ride over the ledge as the carriage advances.

We have now seen how the transfer movements are effected, the manner in which the number wheels are accurately located, the provision made for positively locking the wheels, and the arrangement of the automatic means for unlocking the wheels by the retraction of the carriage. It therefore remains to be described in what manner the computing mechanism is reset or restored to zero after any given computation, as, for instance, the totalizing of a column, has been completed.

Feathered upon one end of the shaft 76 extending beyond the side of the casing 12, is a resetting head 115, provided with a stop pin 116, disposed eccentric to the shaft and designed to engage a recess 117 in the bearing collar 75. (See Figs. 12, 24 and 26.) The stop pin 116 is normally held in engagement with its recess, to prevent the rotation of the shaft, by a spring 118, located within a cylindrical recess 119 in the outer end of the head 115, and bearing at one end against the bottom of the recess and at its opposite end against the head 120 of a screw inserted in the end of the shaft 76. The spring 118 exerts a constant tendency to force the resetting head against the side of the casing, and the stop pin 116 is thus made to hold the shaft absolutely stationary while the computing mechanism is being operated. When it is desired to reset the number wheels (assuming the latter to be unlocked) the head 115 is drawn back against the resistance of the spring 118, to withdraw the stop pin from its recess. The head is then rotated to effect the rotation of the shaft and transfer cams until each wheel is picked up by the engagement of its pawl with the resetting notch 86 of a cam. Since the resetting notches of the several cams are accurately alined, and since the pawls bear an identical relation to the wheels, the engagement of the resetting notches with the beaks of the pawls will present the similar digits of the several number wheels in alinement. This result will of course be effected by one complete rotation of the shaft, but as the starting positions of the pawls are two increments of movement in advance of the resetting notches, (see Fig. 16) we have made provision for moving the shaft somewhat more than a complete rotation, in order that the resetting notches may move a sufficient distance to properly position the pawls and to present the several number wheels at zero, after which the shaft is turned back to present the resetting notches the distance of two increments in rear of the beaks of the pawls. This manipulation of the shaft is facilitated by a check plate 121, (see Figs. 13, 24 and 25) pivotally mounted upon the side of the casing 12 and bifurcated to form a guard 122 and a check finger 123. In the normal position of the plate 121 the guard 122 rests against the pin 116, as shown in Fig. 13, but when the resetting head 115 is drawn back, the pin is removed from its recess and the plate 121 is swung by a spring 124, to present the guard 122 over the recess 117, the movement of the plate being limited by a stop 125. (This position of the plate is indicated in dotted lines in Fig. 24.) The head will now be rotated in the direction indicated by the arrow in Fig. 13, causing the transfer cams to pick up the pawls, and when the stop pin 116 again arrives opposite its recess 117, it will ride over the guard 122, instead of entering the recess, and will not be arrested until it contacts with the check finger 123. The number wheels will now be at zero, but the beaks of the pawls will be in engagement with the resetting notches, and will consequently move into engagement with the ratchet teeth of the adjacent wheels during the first, instead of during the ninth, increment of movement. To prevent this, the shaft is now rotated in the reverse direction, (indicated by the dotted arrow in Fig. 13) the stop pin 116 contacting with the under edge of the guard 122. The plate 121 will thus be swung against the resistance of the spring 124 to move the guard 122 from over the recess. When the pin reaches the recess, it will enter the same as the head is moved toward the casing 12 by the spring 118, and the resetting operation will be completed. The shaft will now be locked with the number wheels at zero, and the transfer cams will be properly positioned to permit the operation of the computing mechanism in the manner heretofore described.

In describing the resetting operation, it has been assumed that the number wheels are unlocked. This would ordinarily be the case, because the carriage would generally be retracted, thus effecting the automatic unlocking of the wheels, prior to the resetting thereof. It might be desirable in some cases, however, to reset the computing device with the carriage in an advanced position, and while this could be done by pushing back the unlocking frame manually, we prefer to provide automatic means independent of the carriage and preferably operated by an element of the resetting mechanism to unlock the wheels preparatory to the resetting thereof. A simple and effective embodiment of such means is illustrated in the accompanying drawings. (See more particularly Figs. 12 and 13.) Upon one side of the casing 12 is mounted a bell-crank unlocking lever 126, having a vertically-disposed arm arranged to engage a pin or other projection 127, extending through a slot 128 in the casing from the unlocking frame 104. The horizontal arm of the lever 126 is provided with a cam 129, disposed in the path of the resetting head 115, and so arranged that when the head is drawn back preparatory to rotating the shaft 76, the bell-crank lever will be oscillated to draw back the unlocking frame, and thereby effect the retraction of the dog-retaining plungers, to permit the disengagement of the locking dogs from the wheels.

To insure the absolute rigidity of the register casing, in order that the master wheel may move with certainty into mesh with the number wheels as the carriage is moved, we provide a brace 130, having the form of a plate rigidly secured to the carriage casing 5, (see Figs. 1 and 2) and extended rearwardly therefrom for engagement with the casing 12 of the computing device whenever the carriage is moved to a position opposite the latter. To insure an effective engagement between the brace and the casing 12, the former is provided at its rear edge with a bead 131, for reception within a correspondingly formed socket in the flange 69.

For the purpose of enabling the operator to readily distinguish the number wheels of different values or orders, we prefer to provide a multi-color indicator adjacent to the sight opening in the register casing, as shown in Fig. 3. Different colors, as for instance purple, green, blue and red, are enameled on or otherwise applied to the top wall of the casing along the upper side of the sight opening, and each color is designed to indicate the order or orders of the opposed number wheel or wheels. Thus in the arrangement shown, purple indicates millions; green indicates thousands, ten thousands and hundred thousands; blue, units, tens and hundreds; and red, the fractional values, as, tenths and hundredths. The colors employed are of course immaterial, and each color obviously may indicate a single wheel or any number of wheels.

In Fig. 33 of the drawings is shown a modified form of contact plate, the forward extension of which is curved for the purpose of effecting the change of leverage gradually as a key is depressed.

Before concluding it may be well to state that where the term "book typewriter" is referred to in its broad sense, it is intended to mean a typewriting machine capable of being used for writing in books, but not necessarily restricted to such use, and including a flat platen and typewriting mechanism, relatively movable.

It is thought that the construction and operation of the described mechanism, considered as a computing device and register, or as a registering and recording calculator, or as a combined calculating and typewriting machine, will be clearly understood from the foregoing description, but, while the illustrated embodiment of the invention is preferable for use in certain contemplated connections, we reserve the right to effect such changes, modifications and variations of the illustrated structure as may be fairly embraced within the scope of the protection prayed.

What we claim is:—

1. The combination with a computing device and a traveling carriage, of an actuator and a series of keys both mounted on the carriage for movement therewith, and means for normally retaining the actuator out of operative relation with the keys, and for establishing an operative connection between the keys and the actuator when the latter is moved into coincidence with the computing device.

2. The combination with a computing device, and an actuator therefor, of a traveling carriage arranged to move the actuator into and out of coincidence with the computing device, a series of operating keys movable with the carriage, and means for automatically effecting an operative connection between the keys and the actuator when the latter is disposed to operate the computing device.

3. The combination with a computing device, and a traveling carriage, of an actuator mounted on and movable with the carriage, numeral keys, and means operated by the advance of the carriage to connect the numeral keys with the actuator when the latter moves into coincidence with the computing device.

4. The combination with a frame, a computing device, a traveling carriage, and numeral keys movable therewith, of an oscillatory member likewise movable with the carriage and normally out of operative relation with the keys, a master wheel movable into and out of coincidence with the computing device, means connecting the oscillatory member and master wheel, and means for moving said member into operative relation with the keys.

5. The combination with a frame, a traveling carriage, and numeral keys, of a computing device, a master wheel therefor, an actuating member movable with the carriage and arranged to transmit a different degree of movement from each numeral key to the master wheel, and means for moving said member into operative relation with the keys.

6. The combination with a frame, a traveling carriage, and numeral keys movable with the carriage, of a computing device mounted independently of the carriage, a master wheel movable with the carriage and disposed to operate the computing device, an actuating member arranged to transmit a different degree of movement from each numeral key to the master wheel, and means for moving said member into and out of operative relation with the keys.

7. The combination with a frame, a traveling carriage, and numeral keys movable with the carriage, of a computing device mounted independently of the carriage, a master wheel movable with the carriage and disposed to operate the computing device, an actuating member operatively connected to the master wheel but normally out of operative relation with the numeral keys, and means operated by the movement of the carriage for moving said actuating member into operative relation with the numeral keys when the master wheel is presented to the computing device.

8. The combination with a frame, a traveling carriage, and numeral keys, of a computing device mounted independently of the carriage, a master wheel movable with the carriage into operative relation with the computing device, an actuating member arranged to transmit a different degree of movement from each numeral key to the master wheel, and automatic means controlling the operative relation between said actuating member and the numeral keys.

9. The combination with a frame, a traveling carriage, and numeral keys, of a computing device mounted independently of the carriage, a master wheel movable with the carriage into and out of operative relation with the computing device, an actuating member arranged to transmit a different degree of movement from each numeral key to the master wheel, and means for automatically moving the member into operative relation with the keys when the master wheel is presented to the computing device, and for maintaining such relation until the master wheel moves to an inoperative position through the advance of the carriage.

10. The combination with a frame, a computing device including a series of digit carriers, and numeral keys, of an actuator for operatively connecting the numeral keys with the several carriers, a trip member controlling the connection between the keys and the actuator, and means carried by the computing device for operating the trip member.

11. The combination with a frame, a computing device thereon, and a traveling carriage, of numeral keys, an actuator movable by the carriage into operative relation with the computing device, a trip controlling the operative connection between the numeral keys and the actuator, and means for operating the trip device when the actuator moves into operative relation with the computing device.

12. The combination with a computing device, a traveling carriage, and an actuator movable thereby into operative relation with the computing device, of numeral keys, means for operatively connecting the actuator with said numeral keys, a trip arm movable with the carriage and controlling such operative connection, and means for engaging the trip arm to operate the same during the movement of the carriage.

13. The combination with a traveling carriage, and a computing device mounted independently thereof, of an actuator and numeral keys movable with the carriage and normally out of operative relation, a trip arm movable to effect an operative relation between the actuator and keys, and means associated with the computing device to engage the trip arm and effect the movement of the latter when the actuator is presented to the computing device.

14. The combination with a computing device, a traveling carriage, and numeral keys movable with the carriage, of a master wheel for operating the computing device, an actuating member for transmitting movement from the keys to the master wheel, means for retaining said member out of operative relation with the keys, said means including a trip arm, and means for operating the trip arm to effect an operative connection of the actuating member with the keys when the master wheel is presented to the computing device.

15. The combination with a frame, and a computing device having a trip flange associated therewith, of a traveling carriage, a master wheel and numeral keys movable with the carriage, an actuating member for transmitting movement from the keys to the master wheel, and means for moving said member into and out of operative relation with the keys, said means including a trip arm arranged to be engaged by the trip flange of the computing device, whereby said trip arm will be moved to present the actuating member in operative relation with the keys and will be retained in such position while the master wheel is traversing the computing device.

16. The combination with a traveling carriage, a master wheel and numeral keys movable therewith, and a computing device mounted independently of the carriage, of a member arranged to transmit movement from the numeral keys to the master wheel, a spring-urged rock-shaft controlling the position of said member, a trip arm extending from the shaft, and means for engaging the arm to rock the shaft through the movement of the carriage.

17. The combination with a frame, a traveling carriage, and printing mechanism movable with the carriage and including numeral keys, of a computing device mounted independently of the carriage, an actuator for the computing device, and means for operatively connecting or disconnecting the actuator and keys.

18. The combination with a frame, a traveling carriage, and printing mechanism movable with the carriage and including numeral keys, of a computing device, an actuator presentable to the computing device through the movement of the carriage and movable by the keys to operate said computing device, and means for automatically connecting the actuator with the numeral keys when so presented.

19. The combination with a frame, a traveling carriage, and printing mechanism movable with the carriage and including numeral keys, of a computing device shiftably supported by the frame to permit its presentation in position to totalize any desired column, actuating mechanism mounted on the carriage and movable therewith into operative relation with the computing device, and automatically operated means controlling the connection between the numeral keys and the actuating mechanism.

20. The combination with a computing device, a traveling carriage, and an actuator and numeral keys movable with the carriage, of a member for transmitting movement from the numeral keys to the actuator, and manually-operated means for moving said member to an inoperative position.

21. The combination with a computing device, and a master wheel and numeral keys movable therewith, of a member for transmitting movement from the keys to the master wheel, and a rock-shaft provided with a cam disposed to move said member to an inoperative position.

22. The combination with a computing device, an actuator therefor, and numeral keys, said actuator being movable into and out of coincidence with the computing device, of means for effecting an operative connection between the numeral keys and the actuator, and separate devices controlling the operative connection between the numeral keys and the actuator, one of said devices being arranged for automatic actuation.

23. The combination with a computing device, actuating means therefor including a wheel, and a traveling carriage, of carriage-feeding mechanism, and a locking device operated by an element of the carriage feeding mechanism to engage the wheel.

24. The combination with a computing device, an actuator therefor, and a traveling carriage arranged to move the actuator to different members of the computing device, of carriage feeding mechanism, and a locking arm operated by the carriage feeding mechanism to engage the actuator and prevent overrunning thereof.

25. The combination with a computing device, an actuator therefor, numeral keys, a traveling carriage and carriage feeding mechanism, of an operating connection between the keys and the actuator including a movable member, means for dogging the member to prevent its retraction, and means brought into action to release said member when the carriage feeding mechanism has operated to release the carriage.

26. The combination with a computing device, a traveling carriage, and keys movable with and controlling the advance of the carriage, of an operating connection between the keys and the computing device, a dog for preventing premature retraction of the connection, key-operated means for moving the dog from its engaging position, and means independent of the keys for restoring the dog to its engaging position.

27. The combination with a computing device, a traveling carriage, keys controlling the advance of the carriage, and an operating connection between the keys and the computing device and including a member movable with the carriage, of a dog preventing premature retraction of said member as a key rises from an incomplete stroke, means for releasing the dog from the member when the key completes its stroke, and means for restoring the dog to its engaging position upon the complete retraction of the member.

28. The combination with a computing device, and a key, of an intermediate operating connection including a movable member, a dog for said member, key-operated means for moving the dog out of engagement with the member, and means operated by the member for restoring the dog to its engaging position.

29. The combination with a computing device, a key, and an intermediate operating connection including a movable member provided with a rack, of a pivoted dog engaging the rack, a key-operated releasing finger for moving the dog out of engagement with the rack, and a projection on said movable member for moving the dog into engagement with the rack.

30. The combination with a computing device, of an actuator, a key and an intermediate operating connection including a movable member, means for dogging said member to prevent its retraction, and key-operated means for simultaneously locking the actuator and releasing the member.

31. The combination with a computing device, of an actuator, a key and an intermediate operating connection including a movable member, a dog engaging the member to prevent its retraction, a checking arm disposed to engage the actuator, and a combined locking and releasing member disposed to operate the dog and checking arm.

32. The combination with a computing device, of an actuator, a key, and an intermediate operating connection including a movable member, a dog engaging the member to prevent its retraction, a checking arm disposed to engage the actuator, a combined locking and releasing member disposed to operate the dog and checking arm, and means for operatively connecting said member with the key as the latter reaches the limit of its stroke.

33. The combination with a computing device, a master wheel therefor, and numeral keys and key levers, of a yoke disposed to be operated by each key lever, a plunger operated by the yoke, an actuating lever operated by the plunger to rotate the master wheel, a dog engaging the plunger to prevent its retraction, and means for moving the dog into and out of engagement with the plunger.

34. The combination with a computing device, a master wheel therefor, and numeral keys and key levers, of a yoke disposed to be operated by each key lever, a plunger operated by the yoke, an actuating lever operated by the plunger to rotate the master wheel, a dog engaging the plunger, key-operated means for releasing the plunger to permit its retraction, and means carried by the plunger for restoring the dog to its engaging position upon the complete retraction of said plunger.

35. The combination with a computing device, an actuator therefor, numeral keys, a traveling carriage, and carriage feeding mechanism, of an operating connection between the keys and the actuator, including a movable member, means for dogging the member to prevent its retraction, and means for simultaneously releasing said member and operating the carriage feeding mechanism.

36. The combination with a computing device, an actuator therefor, numeral keys, a traveling carriage, and carriage feeding mechanism, of an operating connection between the keys and the actuator, including a movable member, means for dogging the member to prevent its retraction, and means operated by an element of the carriage feeding mechanism for releasing the member to permit its retraction.

37. The combination with a computing device, an actuator therefor, numeral keys, a traveling carriage, and carriage feeding mechanism including a key-operated feed yoke, of an operating connection between the keys and the actuator, including a movable member, a dog engaging said member to prevent its retraction, and means operated by the feed yoke for releasing the dog to permit the retraction of the member.

38. The combination with a computing device, a master wheel therefor, a traveling carriage for locating the master wheel, a series of numeral keys and key levers, and an operating connection between the keys and master wheel, including a yoke, a plunger and an actuating lever, of a dog engaging the plunger to prevent its retraction, a checking arm disposed to engage the master wheel, a combined locking and releasing lever disposed to release the dog to permit the retraction of the plunger and to move the checking arm into engagement with the master wheel, and carriage feeding mechanism including a feed yoke operated by the keys and disposed to actuate the combined locking and releasing lever.

39. The combination with a computing device, and a numeral key, of an intermediate connection transmitting motion to the computing device through the entire key stroke and including means for decreasing the leverage exerted by the key, after the inertia of the parts has been overcome.

40. The combination with a computing device, a numeral key, and a key lever, of a motion-transmitting member between the computing device and lever, and a plunger for shifting the connection between said member and the lever during the depression of the key.

41. The combination with a computing device, a numeral key, and a key lever, of a connection between the computing device and lever, including a contact plate having an extension disposed to engage the lever adjacent to its fulcrum, and a heel arranged to be engaged by the lever after predetermined movement thereof.

42. The combination with a computing device, numeral keys, and key levers, of a connection between the levers and the computing device, including a series of contact plates having heels disposed at graduated distances from the levers and extensions engaging the levers adjacent to their fulcrums.

43. The combination with a computing device, numeral keys, and key levers, of a yoke for transmitting movement from the levers to the computing device, and means intermediate of the yoke and key levers for varying the leverage exerted by the keys.

44. The combination with a computing device, numeral keys, and key levers, of a member for transmitting movement from the levers to the computing device, and graduated contact plates carried by the member and provided with lateral extensions engaging the levers adjacent to their fulcrums.

45. The combination with a frame, a traveling carriage, and numeral keys, of a computing device mounted independently of the carriage, and connecting mechanism intermediate of the numeral keys and the computing device, said connecting mechanism including means mounted on the carriage for varying the leverage exerted by the keys.

46. The combination with a frame, a traveling carriage, and numeral keys, of a computing device mounted independently of the carriage, a master wheel mounted on the carriage and movable thereby into engagement with the computing device, and an operative connection between the master wheel and the numeral keys, said connection including an actutaing lever mounted on the carriage and means for varying the leverage.

47. The combination with a frame, a traveling carriage, and printing mechanism including numeral keys and key levers, an oscillatory member disposed for actuation by the key levers, a computing device mounted independently of the carriage, an actuating lever operatively related to the computing device, and a connection between the oscillatory member and the actuating lever, said connection being shiftable with respect to the fulcrum of the lever to vary the leverage.

48. The combination with a computing device, and numeral keys, of an intermediate member, means for varying the leverage exerted by the keys, and separate means for varying the leverage exerted by the member.

49. The combination with a computing device, numeral keys, and key levers, of an actuating lever operatively related to the computing device, a motion-transmitting member intermediate of the key levers and the actuating lever, means for shifting the connection between said member and the key levers during the depression of a key, and means for shifting the connecton between said member and actuating lever during the movement of the latter.

50. The combination with a computing device, a master wheel therefor, and a key, of a key-operated plunger, an actuating lever operated by the plunger to rotate the master wheel, and a variable connection between the plunger and the actuating lever designed to vary the leverage.

51. The combination with a computing device, and a master wheel therefor, of a key, a key-operated plunger, an actuating lever for the master wheel, a variable connection between the plunger and the actuating lever, and a second variable connection between the plunger and key.

52. The combination with a frame, a traveling carriage, and printing mechanism movable with the carriage and including numeral keys and key levers, of an oscillatory member mounted on the carriage, contact plates carried by said member and disposed to be engaged by the key levers, a computing device mounted independently of the carriage, and actuating mechanism operatively related to the oscillatory member and disposed to actuate the computing device.

53. The combination with a computing device including a series of number wheels, of means for locking said number wheels, a typewriting machine carriage, and means, operated by the carriage, for unlocking the wheels.

54. The combination with a computing device including a series of number wheels, and locking means therefor, of a traveling carriage, keys for operating the number wheels, and means for automatically unlocking said number wheels upon the retraction of the carriage.

55. The combination with a computing device including a series of number wheels, and locking means therefor, of a traveling carriage, an actuator presentable to the number wheels through the advance movement of the carriage, keys for operating the actuator, and means for automatically unlocking the wheels upon the retraction of the carriage.

56. The combination with a computing device including a series of number wheels, and locking means therefor, of a traveling carriage, a master wheel presentable to the number wheels through the advance movement of the carriage, keys for operating the master wheel, and means mounted on the carriage for automatically unlocking the wheels.

57. The combination with a computing device including a series of number wheels, and locking dogs therefor, of a traveling carriage, a master wheel presentable to the number wheels through the movement of the carriage, operating keys for the master wheel, an unlocking cam movable with the carriage, and means operated by said cam to release the locking dogs from the number wheels when the carriage is retracted.

58. The combination with a computing device including a series of number wheels, and locking dogs therefor, of a traveling carriage, a master wheel presentable to the number wheels through the advance movement of the carriage, operating keys for the master wheel, an unlocking cam movable with the carriage, and an unlocking frame disposed for engagement by the unlocking cam to effect the release of the dogs from the number wheels.

59. The combination with a computing device including a series of number wheels, and locking dogs therefor, of a traveling carriage, a master wheel, operating keys therefor, an unlocking cam having hinged connection with the carriage, and an unlocking frame disposed to effect the release of the dogs from the number wheels, said frame being provided with a ledge disposed to be engaged by the cam to operate the frame when the carriage is moved in one direction, and to elevate the cam to an inoperative position during the advance movement of the carriage.

60. The combination with a rotary shaft, number wheels thereon, and transfer cams fixed to the shaft, of means for effecting an intermittent operative connection between the wheels, means for rotating the shaft in one direction to reset the wheels, said shaft being rotatable in the opposite direction to position the cams, and means for arresting the shaft when the wheels have been properly reset and the cams repositioned.

61. The combination with a rotary shaft provided with a resetting head and a stop pin for holding the shaft normally stationary, of number wheels mounted on the shaft and provided with pawls and ratchet disks, cams fixed on the shaft to control the movements of the pawls and provided with means for engaging said pawls to permit the resetting of the wheels through the rotation of the shaft, means for engaging the stop pin to arrest the wheels when properly reset, and other means for engaging the stop pin when the cams have been properly positioned.

62. The combination with a casing having a recess in one side wall thereof, of a shaft journaled in the side walls of the casing, an independently movable resetting head mounted on the shaft and provided with a stop pin engaging said recess, number wheels mounted on the shaft and provided with pawls and ratchet disks, transfer cams fixed to the shaft to control the movements of the pawls and having resetting notches to engage said pawls for the purpose of resetting the wheels through the rotation of the shaft, and a swinging stop plate mounted on the side of the casing, said stop plate having a guard disposed to cover the recess to prevent the stop pin from prematurely entering the same, and also having a stop finger to arrest the stop pin when the wheels have been properly positioned, and said stop plate having a cam face engaged by the stop pin to swing the guard away from the recess to permit the entrance of the stop pin after the cams have been properly positioned.

63. The combination with a computing device, a master wheel therefor, and numeral keys and key levers, of a yoke disposed to be operated by each key lever, a plunger operated by the yoke, and an actuating lever operated by the plunger to rotate the master wheel.

64. The combination with a computing device, of a master wheel therefor, numeral keys, and an intermediate operating connection, one or more of the elements of said connection being counterbalanced.

65. The combination with a computing device comprising a series of toothed number wheels, of a traveling carriage, a master wheel for actuating said wheels and movable with the carriage, a pawl carried by the master wheel, an independently rotary ratchet wheel disposed to engage the pawl to rotate the master wheel, a pinion movable with said ratchet wheel, an actuating lever having a segmental rack, engaging the pinion, and means for preventing reverse rotation of the master wheel.

66. The combination with a computing device comprising a series of number wheels, of a traveling carriage, a shaft mounted on and movable with the carriage, a master wheel rotatably mounted on said shaft and provided with a pawl, a sleeve independently rotatable upon the shaft and provided upon one end with a ratchet wheel disposed to engage the pawl and upon its opposite end with a pinion, and an actuating lever mounted on the carriage and provided with a segmental rack meshing with the pinion.

67. The combination with a frame, and a traveling carriage, of a computing device supported by the frame and including a casing, actuating means mounted on the carriage and shiftable thereby into operative relation with the computing device, and a brace extending from the carriage to engage the casing of the computing device while the latter is in use.

68. In a computing device, the combination with a casing having a sight opening and a multi-colored indicator exhibited on the casing at the edge of the opening, of a series of number wheels exposed at the sight opening and arranged according to their order or value, opposite the different colors of the indicator.

69. The combination with a typewriter including a carriage, keys, and printing mechanism, of adding mechanism coöperatively related to the keys and including a series of denominational members, member locking mechanism, and means whereby the movement of the carriage will cause the retraction of the locking mechanism.

70. The combination with a typewriter including a carriage, keys, and printing mechanism, of adding mechanism having its operation controlled by the keys and including a series of denominational members and a series of locking members therefor, and retracting means common to the several locking members and arranged to be operated by the typewriter carriage.

71. In a combined typewriting and calculating machine, the combination with a typewriter including a carriage, keys, and printing mechanism, of a computing device normally disconnected from the keys, automatic means for causing an operative connection to be established between the computing device and keys, and means including a key for rendering the automatic means inoperative.

72. In a combined typewriting and adding machine, the combination with a typewriter including a carriage, keys, and printing mechanism, of a register normally disconnected from the keys, automatic means brought into action by the movement of the carriage to connect the keys and register, a key operative to render the automatic means inoperative, and means for retaining the key.

73. In a combined typewriting and calculating machine, the combination with a typewriter including a carriage, keys, and printing mechanism, of a register normally disconnected from the keys, a device adapted to be operated manually to connect the register and keys, and automatic means for operating the device at a predetermined point in the carriage movement.

74. In a combined typewriting and calculating machine, the combination with a typewriter including a carriage, keys, and printing mechanism, of a register, an actuator therefor normally disconnected from the keys, a device adapted to be actuated manually to operatively connect the actuator with the keys, and means for automatically actuating said device at a predetermined point in the carriage movement.

75. The combination with a frame, a traveling carriage, and numeral keys, of a computing device and master means therefor, actuating means movable with the carriage and arranged to transmit a different degree of movement from each numeral key to the master means and means for moving said actuating means into operative relation with the keys.

76. The combination with a frame, a traveling carriage, and numeral keys movable with the carriage, of a computing device mounted independently of the carriage, a master means movable with the carriage and disposed to operate the computing device, actuating means arranged to transmit a different degree of movement from each numeral key to the master means, and means for moving said actuating means into and out of operative relation with the keys.

77. The combination with a frame, a traveling carriage, and numeral keys movable with the carriage, of a computing device mounted independently of the carriage, a master means movable with the carriage and disposed to operate the computing device, actuating means operatively related to the master means but normally out of operative relation with the numeral keys, and means operated by the movement of the carriage for moving said actuating means into operative relation with the numeral keys when the master means is brought into coöperative relation with the computing device.

78. The combination with a frame, a traveling carriage, and numeral keys, of a computing device mounted independently of the carriage, a master wheel movable with the carriage into operative relation with the computing device, actuating means arranged to transmit a different degree of movement from each numeral key to the master wheel and automatic means controlling the operative relation between said actuating means and the numeral keys.

79. The combination with a frame, an adjustable computing device including a series of digit carriers, and numeral keys, of actuating means intermediate of the numeral keys and digit carriers, means controlling the connection between the keys and the actuating means, and means adjustable with the computing device for operating said controlling means.

80. The combination with a computing device, a traveling carriage, and an actuator and numeral keys movable with the carriage, of means for transmitting movement from the numeral keys to the actuator and manually operative means for moving said transmitting means to an inoperative position.

In testimony that we claim the foregoing as our own, we have hereto affixed our signatures in the presence of two witnesses.

CHARLES FREDERICK LAGANKE.
JOHN ASBURY SMITH.

Witnesses:
GEO. C. RUSSELL,
FRED. W. THIRSSELL.